US011789867B2

(12) United States Patent
Uhrenholt et al.

(10) Patent No.: US 11,789,867 B2
(45) Date of Patent: Oct. 17, 2023

(54) CACHE ARRANGEMENT FOR DATA PROCESSING SYSTEMS

(71) Applicant: Arm Limited, Cambridge (GB)

(72) Inventors: Olof Henrik Uhrenholt, Lomma (SE); Andreas Due Engh-Halstvedt, Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/742,495

(22) Filed: Jan. 14, 2020

(65) Prior Publication Data

US 2021/0216455 A1 Jul. 15, 2021

(51) Int. Cl.
| | | |
|---|---|---|
| G06F 12/0811 | (2016.01) | |
| G06F 9/30 | (2018.01) | |
| G06F 9/38 | (2018.01) | |
| G06F 3/06 | (2006.01) | |

(52) U.S. Cl.
CPC .......... *G06F 12/0811* (2013.01); *G06F 3/064* (2013.01); *G06F 3/0623* (2013.01); *G06F 3/0685* (2013.01); *G06F 9/30196* (2013.01); *G06F 9/3877* (2013.01)

(58) Field of Classification Search
CPC .. G06F 12/0811; G06F 3/0685; G06F 9/3877; G06F 3/0623; G06F 3/064; G06F 9/30196; G06F 12/0895; G06F 2212/401; G06F 2212/1056; G06F 12/0804; G06F 2212/1004; G06F 12/128; G06F 2212/455
USPC .................................................. 711/122, 119
See application file for complete search history.

(56) References Cited

U.S. PATENT DOCUMENTS

| | | | |
|---|---|---|---|
| 5,943,421 A | * | 8/1999 | Grabon .................. G06F 21/62 380/269 |
| 6,181,350 B1 | | 1/2001 | Corona |
| 6,449,692 B1 | | 9/2002 | Krueger et al. |
| 6,483,516 B1 | | 11/2002 | Tischler |
| 6,518,974 B2 | | 2/2003 | Taylor |
| 7,171,051 B1 | | 1/2007 | Moreton |
| 8,271,734 B1 | | 9/2012 | Glasco |
| 8,411,753 B2 | | 4/2013 | Cha |
| 8,447,948 B1 | | 5/2013 | Erdogan |
| 8,542,939 B2 | | 9/2013 | Nystad |
| 8,988,443 B2 | | 3/2015 | Croxford |
| 8,990,518 B2 | | 3/2015 | Nystad |
| 9,014,496 B2 | | 4/2015 | Nystad |
| 9,116,790 B2 | | 8/2015 | Nystad |
| 9,239,784 B1 | | 1/2016 | Haghighi |

(Continued)

OTHER PUBLICATIONS

Office Action dated Nov. 11, 2019, U.S. Appl. No. 15/714,037.

(Continued)

*Primary Examiner* — David Yi
*Assistant Examiner* — Zubair Ahmed
(74) *Attorney, Agent, or Firm* — Vierra Magen Marcus LLP

(57) ABSTRACT

A data processing system includes a cache system configured to transfer data stored in the memory system to a processor and to transfer data from the processor to the memory system. The cache system comprises a cache and a data encoder associated with the cache that is configured to encode uncompressed data from the cache for storing in the memory system in a compressed format, and decode compressed data from the memory system for storing in the cache in an uncompressed format.

21 Claims, 11 Drawing Sheets

(56) References Cited

U.S. PATENT DOCUMENTS

| | | | |
|---|---|---|---|
| 9,406,155 | B2 | 8/2016 | Oterhals |
| 9,881,401 | B2 | 1/2018 | Oterhals |
| 10,388,057 | B2 | 8/2019 | Fielding |
| 2003/0151610 | A1 | 8/2003 | Kuriakin |
| 2003/0217237 | A1* | 11/2003 | Benveniste ......... G06F 12/1027 |
| | | | 711/207 |
| 2007/0252843 | A1 | 11/2007 | Yu |
| 2009/0160857 | A1 | 6/2009 | Rasmusson |
| 2010/0161904 | A1 | 6/2010 | Cypher |
| 2010/0281212 | A1* | 11/2010 | Selvan ................ G06F 12/0804 |
| | | | 711/114 |
| 2014/0122809 | A1 | 5/2014 | Robertson |
| 2014/0140401 | A1 | 5/2014 | Lee |
| 2014/0156948 | A1 | 6/2014 | Roberts |
| 2014/0330796 | A1 | 11/2014 | Dally |
| 2015/0169459 | A1 | 6/2015 | Huang |
| 2015/0178214 | A1 | 6/2015 | Alameldeen |
| 2016/0048980 | A1 | 2/2016 | Wang |
| 2017/0024158 | A1 | 1/2017 | Brkic et al. |
| 2017/0255562 | A1* | 9/2017 | Usui ................... G06F 12/0886 |
| 2017/0256024 | A1 | 9/2017 | Abraham |
| 2017/0262373 | A1 | 9/2017 | Bedi |
| 2017/0285955 | A1 | 10/2017 | Carter et al. |
| 2017/0286302 | A1 | 10/2017 | Roy |
| 2017/0287101 | A1 | 10/2017 | Flordal et al. |
| 2017/0293561 | A1 | 10/2017 | Dwiel |
| 2017/0295379 | A1 | 10/2017 | Sun |
| 2018/0089091 | A1 | 3/2018 | Akenine-Moller |
| 2018/0286010 | A1 | 10/2018 | Koker et al. |
| 2019/0096027 | A1 | 3/2019 | Fielding |
| 2020/0160484 | A1* | 5/2020 | Appu ......................... G06T 1/60 |
| 2020/0167076 | A1* | 5/2020 | Lai ........................... G06F 3/064 |

OTHER PUBLICATIONS

Response to Office Action dated Jul. 10, 2019, U.S. Appl. No. 15/714,037.
Final Office Action dated Aug. 6, 2019, U.S. Appl. No. 15/714,037.
Office Action dated Dec. 12, 2018, U.S. Appl. No. 16/029,619.
Response to Office Action dated Mar. 12, 2019, U.S. Appl. No. 16/029,619.
Notice of Allowance dated Apr. 5, 2019, U.S. Appl. No. 16/029,619.
UK Patent Application No. 1711269.9, filed Jul. 13, 2017, "Graphics Processing Systems," Applicant Arm Limited.
UK Filing Receipt dated Jul. 13, 2017, UK Patent Application No. 1711269.9, filed Jul. 13, 2017, "Graphics Processing Systems," Applicant Arm Limited.
Zhang et al., Enabling Partial Cache Line Prefetching Through Data Compression, URL: www.cs.ucr.edu/~gupta/research/Publications/Comp/icpp03.pdf (Year: 2003).
Non-Final Office Action dated Feb. 26, 2021 in U.S. Appl. No. 16/742,556.
Uhrenholt, et al., U.S. Appl. No. 16/742,519, titled "Cache Operations in Data Processing Systems," filed Jan. 14, 2020.
Uhrenholt, et al., U.S. Appl. No. 16/742,556, titled "Data Processing Systems," filed Jan. 14, 2020.
Non-Final Office Action dated May 17, 2021, U.S. Appl. No. 16/742,519.
Cheriton et al., "Software-Controlled Caches in the VMP Multiprocessor", May 1986, ACM, ACM SIGARCH Computer News, pp. 366-374, (1986).
Jacob et al., "Software-Managed Address Translation", Feb. 1997, IEEE, HPCA '97, pp. 156-167 (1997).
Abali et al., "Performance of Hardware Compressed Main Memory", Jan. 2001, IEEE, HPCA '01, pp. 73-81 (2001).
Espasa et al., "Tarantula: A Vector Extension to the Alpha Architecture", May 2002, IEEE, ISCA '02, pp. 281-292 (2002).
Zheng et al., "Performance Evaluation of Exclusive Cache Hierarchies", Mar. 2004, IEEE, ISPASS '04, pp. 89-96 (2004).
Shahar et al., "ActivePointers: A Case for Software Address Translation on GPUs", Jun. 2016, ACM/IEEE '16, pp. 596-608 (2016).
Response to Non-Final Office Action dated May 26, 2021, U.S. Appl. No. 16/742,556.
Response to Final Office Action dated Sep. 29, 2021, US. Appl. No. 16/742,556.
Final Office Action dated Jul. 30, 2021, U.S. Appl. No. 16/742,556.
Response to Non-Final Office Action dated Aug. 17, 2021, U.S. Appl. No. 16/742,519.
Final Office Action dated Aug. 25, 2021, U.S. Appl. No. 16/742,519.
Shanley, Tom, The Unabridged Pentium 4 IA32 Processor Genealogy, "Finding the Location of a Physical Page", Jul. 2004.
Response to Final Office Action dated Feb. 23, 2022, U.S. Appl. No. 16/742,519.
Notice of Allowance dated Oct. 21, 2021, US. Appl. No. 16/742,556
Non-Final Office Action dated Apr. 1, 2022, U.S. Appl. No. 16/742,519.
Barroso et al., "Piranha: A Scalable Architecture Based on Single-Chip Multiprocessing", 2000 ACM, pp. 282-293.
Stallings, William, "Computer Organization and Architecture: Designing for Performance", 2010 Prentice Hall, 8th ed., pp. 640-645.
Response to Non-Final Office Action dated Jul. 1, 2022, U.S. Appl. No. 16/742,519.
Final Office Action dated Jul. 15, 2022, U.S. Appl. No. 16/742,519.
Response to Final Office Action dated Dec. 30, 2022, U.S. Appl. No. 16/742,519.
Notice of Allowance dated Feb. 13, 2023, U.S. Appl. No. 16/742,519.
Lefurgy, Charles et al. "Reducing Code Size with Run-time Decompression", Jan. 2000, IEEE, HPCA 2000, pp. 1-10.
IBM "CodePack PowerPC Code Compression Utility User's Manual", Version 4.1, Mar. 2001, pp. 1-59.

* cited by examiner

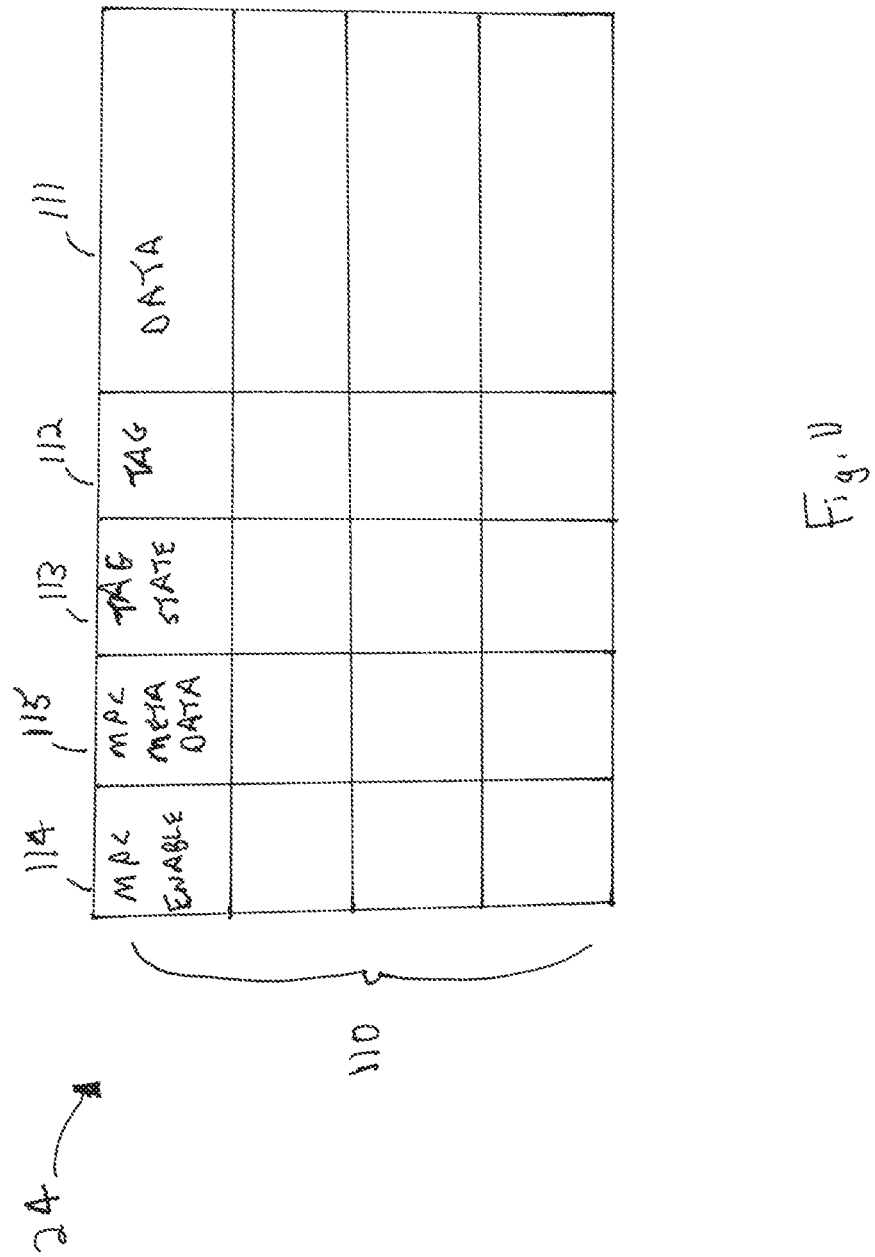

CACHE ARRANGEMENT FOR DATA PROCESSING SYSTEMS

BACKGROUND

The technology described herein relates to data processing systems and in particular to cache operations in a data processing system, such as a graphics processing system.

Graphics processing operations, which may be performed by a graphics processor (graphics processing unit (GPU)), typically process data in an uncompressed form. When such operations have produced a particular output (e.g. frame), the output data may then be written to a (e.g. frame) buffer, for example in main memory, for storage before further processing (e.g., display of the frame).

To reduce the amount of data that needs to be transferred to and from memory, and the associated power cost of moving such data back and forth, during a graphics processing operation, the data may be compressed before being written to memory. This allows the data to be stored in a compressed format. When the data is required for further processing, the compressed data is then read from memory and decompressed, such that it is then in a suitable format for the graphics processing operations.

To assist with storing data locally to a graphics processing unit while the graphics processing operations using this data are being performed, a cache may be used. This helps to reduce the need to fetch data from slower data stores, such as main memory of the graphics processing system.

The Applicants believe that there remains scope for improvements to cache operations in graphics processing systems.

BRIEF DESCRIPTION OF THE DRAWINGS

Various embodiments of the technology described herein described herein will now be described by way of example only and with reference to the accompanying drawings, in which:

FIG. 11 shows the arrangement of the cache in embodiments of the technology described herein.

Like reference numerals are used for like elements and features in the Figures, where appropriate.

DETAILED DESCRIPTION

Figure 1:
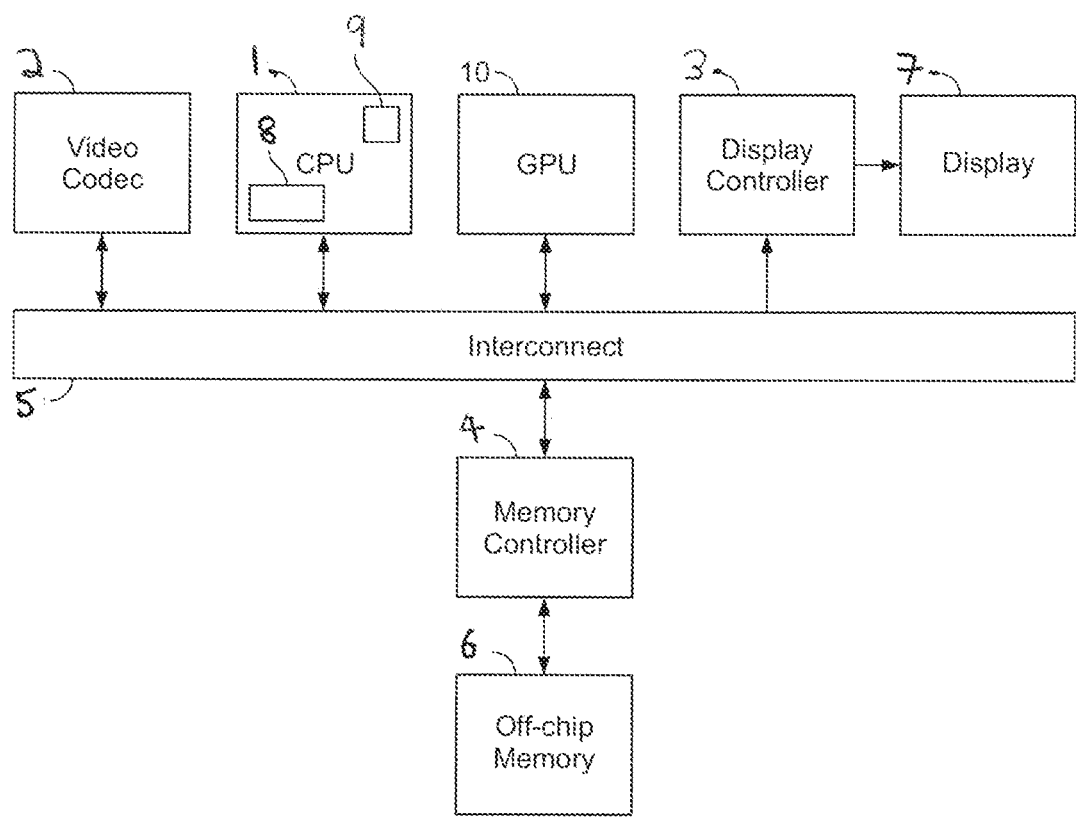
FIG. 1 shows an exemplary graphics processing system in which the technology described herein may be implemented.

A first embodiment of the technology described herein comprises a graphics processing system comprising:
 a memory system;
 a graphics processor; and
 a cache system configured to transfer data stored in the memory system to the graphics processor for use by the graphics processor when performing graphics processing operations and to transfer data from the graphics processor to the memory system;
 the cache system comprising:
  a cache configured to receive data from the memory system and to provide data to the graphics processor for use when performing graphics processing operations and to receive data from the graphics processor for sending to the memory system; and
  a data encoder associated with the cache and configured to:
   when data is to be written from the cache to the memory system, encode uncompressed data from the cache for storing in the memory system in a compressed format and send the data in the compressed format to the memory system for storing; and
   when data in a compressed format is to be read from the memory system into the cache, decode the compressed data from the memory system and store the data in the cache in an uncompressed format.

A second embodiment of the technology described herein comprises a method of operating a graphics processing system, the graphics processing system comprising:
 a memory system;
 a graphics processor; and
 a cache system configured to transfer data stored in the memory system to the graphics processor for use by the graphics processor when performing graphics processing operations and to transfer data from the graphics processor to the memory system;
 the cache system comprising a cache configured to receive data from the memory system and to provide data to the graphics processor for use when performing graphics processing operations and to receive data from the graphics processor for sending to the memory system, and a data encoder associated with the cache;
 the method comprising:
  when data is to be written from the cache to the memory system, the data encoder encoding uncompressed data from the cache for storing in the memory system in a compressed format and sending the data in the compressed format to the memory system for storing; and
  when data in a compressed format is to be read from the memory system into the cache, the data encoder decoding the compressed data from the memory system and storing the data in the cache in an uncompressed format.

Thus the technology described herein provides a graphics processing system (and a method of operating a graphics processing system) that includes a (e.g. main) memory system, a graphics processor (e.g. GPU) and a cache system. The memory system stores data that may be required by the graphics processor. The graphics processor may be arranged to perform graphics processing operations (using the data, e.g. in an uncompressed format), such as generating a render output (e.g. a frame, e.g. for display).

The cache system is arranged to transfer data from the memory system to the graphics processor (such that the graphics processor may use this data to perform graphics processing operations), and vice-versa. The cache system includes a cache arranged to receive and store data from the memory system. The data is stored in the cache in an uncompressed (decoded) format.

The cache system also includes a data encoder associated with the cache. The data encoder is arranged to encode (compress) uncompressed data from the cache, when this data is to be written from the cache to the memory system, and to send the compressed data to the memory system for storing. The data encoder is also arranged to decode (decompress) compressed data from the memory system, when this data is to be read (retrieved) from the memory system (and written) into the cache, for storing in the cache in an uncompressed format. Thus the encoder reads in and stores data from the memory system in the cache an uncompressed form, and returns data to the memory system in a compressed form.

This contrasts with providing an encoder that is integrated with the (e.g. main, external (e.g. off-chip)) memory itself or with the processing cores themselves of the graphics processor.

It will be appreciated that by providing and associating (e.g. integrating) a data encoder/decoder with the cache, this allows the compression (encoding) and decompression (decoding) of data (as appropriate) that is to be transferred between the graphics processor and the memory system (and stored, e.g. temporarily, in the cache while being used by the graphics processor), to be performed by the cache system itself. This helps to facilitate the graphics processing system to be used with newer APIs (application programming interfaces) such as Vulkan, while maintaining appropriate synchronisation of the compressed data stored in the memory system.

This is because the cache system simply makes available to the graphics processor (and thus any graphics processing pipeline and/or shaders to be implemented by, or any API to be used with, the graphics processor) the uncompressed data it requires, without the graphics processor having to have any knowledge of or compatibility with the nature of the compression that is used by the data encoder and the memory system. Similarly, the memory system is able to store the data in any suitable and desired compressed (e.g. block-based) manner, without needing any knowledge of or compatibility with the way in which the (uncompressed) data is processed by the graphics processor.

The graphics processing system of the technology described herein includes a memory system, a graphics processor and a cache system.

The memory (memory system) of the graphics processing system that the cache system of the technology described herein interfaces with may comprise any suitable and desired memory and memory system of the graphics processing system (e.g. of an overall data processing system that the graphics processing system is part of), such as, and in an embodiment, a main memory for the graphics processing system (e.g. where there is a separate memory system for the graphics processor), or a main memory of the data processing system that is shared with other elements, such as a host processor (CPU), of the data processing system.

The graphics processor of the graphics processing system can comprise any suitable and desired graphics processor. The graphics processor should, and in an embodiment does, comprise one or more (and in an embodiment a plurality of) processing (shader) cores, which are operable to perform graphics processing operations on data to be processed by the graphics processor.

Correspondingly, the cache system and the cache is in an embodiment configured to provide data to the processing core or cores of the graphics processor for use when performing graphics processing operations and correspondingly to receive data from the processing core or cores of the graphics processor for sending to the memory system.

The cache system that is arranged between the memory system and the graphics processor can be any suitable and desired cache system that is operable to and configured to hold data between the graphics processor (the processing core or cores of the graphics processor) and the memory system.

The cache system may comprise a single cache "level", in which case it will be that cache level that is associated with the data encoder (and that stores data in the uncompressed form for use by the graphics processor when performing graphics processing operations).

In embodiments, the cache system comprises multiple cache levels (a cache hierarchy), such as L2 and L3 caches. In this case, the cache that is associated with the data encoder (and that receives data in a compressed form but stores data in an uncompressed form for use by the graphics processor) is one level of the cache system (with other levels of the cache system then not having a data encoder associated with them). In this case, the cache that is associated with the data encoder and that operates in the manner of the technology described herein is the cache level that is closer to the graphics processor (the processing cores of the graphics processor) and in an embodiment the cache level from which data is provided to and received from the processing cores of the graphics processor of the cache hierarchy, such as, and in an embodiment, the L2 cache.

Thus, in an embodiment, the cache that is configured to receive data from the memory system to provide data to the graphics processor for use when performing graphics processing operations and to receive data from the graphics processor for sending to the memory system and that has an associated data encoder in the manner of the technology described herein is the L2 cache of the cache system. Correspondingly, the data encoder is in an embodiment between the L2 cache of the graphics processor and the (external) memory system, and in an embodiment integrated into the L2 cache system of the graphics processor.

It will be appreciated in this regard that where the cache system includes multiple cache levels, with only one of which cache levels, e.g. the L2 cache, operating in the manner of the technology described herein, then the writing of data from the cache to the memory system and the reading of data from the memory system into the cache (that operates in the manner of the technology described herein) may comprise writing that data to and reading that data from a cache level that is closer to the memory system, as appropriate (where the required data can be and/or is already cached in the cache system at a level that is closer to the memory system itself).

In other words, when reading data from the memory system into the cache in the operation of the technology described herein, that data can be read from a cache level that is closer to the memory system and does not necessarily need to be retrieved from the memory system itself if it is already available in a cache that is closer to the memory system. Correspondingly, the operation in the manner of the technology described herein when writing data from the cache to the memory system relates to the operation where the data is written from the cache towards the memory system, but that data could be retained at a higher level in the cache system that is closer to the memory system without reaching the memory system itself.

Thus references to writing data from the cache (that is associated with the data encoder) to the memory system, and reading data in a compressed format from the memory system into the cache (that is associated with the data encoder) refers in general to writing data "towards" the memory system, and reading data into the cache, and therefore encompasses writing data to and/or reading data from a level of the cache system (e.g. the L3 cache) that is closer to the memory system, without necessarily requiring the data to reach the memory system itself or to be fetched from the memory system itself (although the intention will normally be that the data is to reach the memory system or come from the memory system, it will just be that the cache system operation may avoid the need to actually go all the way to the memory system when writing/reading the data).

Subject to the particular operation of the technology described herein, the cache system can otherwise operate in any suitable and desired manner, such as, and in an embodiment, in accordance with the normal manner for cache operations in the graphics processing system in question.

For instance, when the graphics processor requires some input data that is presumed to reside in the memory system, a read request for that data is first issued to the cache system, with the read request being passed through the cache and memory hierarchy, i.e. from the graphics processor to the cache system and ultimately to the memory system, as required.

That is, when the requested data is present in the cache of the technology described herein, the data can then be provided to the graphics processor for processing thereby. On the other hand, when the requested data is not present in the cache of the technology described herein, the data must first be fetched into the cache from the memory system (by issuing a memory read request).

Correspondingly, when the graphics processor has data that is to be written to the memory system, the graphics processor will issue a write request to write that data to the cache (that is associated with the data encoder), and the data will be written to the cache. Data in the cache that is associated with the data encoder will then be written back to the memory system when it falls to be evicted from the cache.

The cache (that is associated with the data encoder) and into which data is written by the data encoder and read from by the data encoder, can be configured in any suitable and desired manner, e.g. in accordance with the normal cache arrangements of the graphics processor and graphics processing system in question.

Thus the cache will in an embodiment comprise a plurality of cache lines, each able to store a respective data entry or entries. Each cache line will also be associated with appropriate metadata, such as, and in an embodiment, one or more of, and in an embodiment all of: an identifier (a tag) for the data that is stored in the cache line; a "valid" flag (bit) to indicate that the data in the cache line is valid; a "free" flag (bit) to indicate that the cache line is available for allocation for storing data; and a "dirty" flag (bit) to indicate that the data in the cache line has been modified since it was written from the memory to the cache line.

In an embodiment, the data entries in the cache (the cache lines) can be, and are also, associated with an indication of whether the data entry (the cache line) should be processed by the data encoder or not. Thus, in an embodiment, each cache line is associated with a "data encoder" flag (bit) to indicate whether that cache line (the data in that cache line) should be processed by the data encoder or not. This indication may be set, for example, on cache line fill or write from lower level caches.

In this case, if the "data encoder" flag is set to indicate that the cache line should be processed by the data encoder, then the data encoder will operate with respect to the cache in the manner of the technology described herein. On the other hand, if the "data encoder" flag is not set (such that the cache line is not indicated as to be handled by the data encoder), then the cache line can be handled in the normal manner for the cache and cache system in question.

Thus, in an embodiment, some entries in the cache (cache lines) will be handled by the data encoder, whereas other entries in the cache (cache lines) may be handled in the normal manner for the cache and cache system in question.

It would also be possible for the cache metadata to indicate other information, such as the form of compression to use and additional pixel format information, or other encoding information, if desired. This information could also or instead be stored elsewhere, for example in association with the data array itself rather than in the tag array of the cache. Other arrangements would, of course, be possible.

There may be a single physical cache, or the cache may be divided into plural separate physical portions ("slices"), with each slice, e.g., storing respective data, e.g. for a respective processing core of the graphics processor.

The cache that is associated with the data encoder may interface with the graphics processor (the processing cores of the graphics processor) so as to be able to transfer data therebetween in any suitable and desired manner. In an embodiment, there is an appropriate interconnect, such as an asynchronous switch network (ASN), that interfaces between the cache (e.g. the L2 cache) and the graphics processor (the processing core(s) of the graphics processor).

The data that is stored in the cache (and that the graphics processor is using when performing a graphics processing operation) can comprise any suitable and desired data that a graphics processor may operate on. The data in an embodiment comprises data of a data array that the graphics processor is processing, the data array comprising an array of data elements each having an associated data value(s).

The data array may comprise, for example, and in an embodiment, an image that the graphics processor is processing, and thus the data will comprise appropriate colour values for the data elements (sampling positions) of the data array and that the data array represents. In this case, the data array may comprise, for example, a frame (the frame buffer) that the graphics processor is processing, e.g. for display, and/or data, such as a graphics texture, that is being used or generated by the graphics processor. In other arrangements, the data may comprise geometry data, such as for or of vertices and/or primitives that the graphics processor is processing. Thus, in an embodiment, the data that is stored in the cache and handled in the manner of the technology described herein comprises image data (e.g. a texture or frame) or geometry data (positions and/or attributes).

The graphics processing operation that the graphics processor is performing using the data can correspondingly be any suitable and desired processing operation that a graphics processor can perform. Thus it may, for example, be an appropriate graphics geometry processing operation, or a fragment (pixel) shading operation, etc. In an embodiment, the processing operation is a graphics shading operation, such as a geometry shading, vertex shading, or fragment shading operation. The operation could also be a compute shading operation, where the graphics processor is performing compute shading operations.

The data encoder that is associated with the cache and that is operable to decompress compressed data from the memory system for writing into the cache and to compress data from the cache for writing back to the memory system can be any suitable and desired data encoder that can operate in this manner.

In general, the data encoder should be operable to receive data that is coming from the memory system before it is stored in the cache that it is associated with, so as to, for example, and in an embodiment, process (decompress) that data before then storing that data in the cache. Correspondingly, the data encoder should be and is in an embodiment operable to read data from that cache and process it (e.g. compress it) before that data is then stored in the memory system (and in the case of a multi-level cache system, in another level of the cache system that is closer to the memory system than the cache level that is associated with the data encoder).

The data encoder should, and does in an embodiment, comprise an appropriate codec (data coder/decoder) operable to and configured to encode (compress) data to be written from the cache to the memory system and to decode (decompress) data to be read from the memory system into the cache.

The data encoder may comprise a plurality of codecs. The plurality of codecs may be configured to encode and decode the data using a plurality of (e.g. different) encoding and decoding techniques respectively.

In one set of embodiments the data encoder comprises (local) storage, e.g. a buffer, configured to store the data that is to be encoded or decoded, e.g. while the data is being encoded or decoded and/or before the data is written to the cache or (towards) the memory system. Thus, the data will be temporarily buffered in the data encoder while it is being encoded/decoded, before it is written, etc.

In one set of embodiments the data encoder comprises a controller configured to receive messages (notifications) from the cache that its operation is required, and to, in response thereto, trigger and control the appropriate operation of the data encoder.

The message may, for example, indicate whether the operation is a read or write or evict operation, together with an indication of the relevant data (e.g. data block), e.g. data (block) address, that the request relates to, with the controller (control unit) of the data encoder then operating to trigger the appropriate encode/decode (compression/decompression) operation and reading or writing of the identified data (block), as appropriate. Other arrangements would, of course, be possible.

In one set of embodiments the data encoder comprises a read circuit configured to read data from the memory system (e.g. via other levels of the cache hierarchy) and from the cache, and a write circuit configured to write data to the cache and from the cache to the memory system (again via other levels of the cache hierarchy, as appropriate).

The data encoder (the codec(s) of the data encoder) may use any suitable and desired encoding and decoding technique(s). Thus the data encoder may be configured to perform any suitable and desired encoding (e.g. compression) and decoding (e.g. decompression) operation(s), e.g. in dependence on the compression format(s) that may be used for the data.

In one set of embodiments the data encoder is configured to encode and decode data using a block-based compression technique.

Thus, in this case, the data will be compressed using a block-based compression scheme, and thus stored as respective (compressed) blocks of data in the memory system.

Thus, in this case, respective blocks of the, e.g. data array, will be encoded (compressed) separately, with those blocks then being stored either in an uncompressed or compressed form as respective blocks, as appropriate. In this case, each block of data (of the data array) may correspond to an appropriate region (e.g. tile) of a data array that the graphics processor is able to operate on, such as an appropriate, e.g. 16×16 sampling position, rendering tile.

As will be seen below, these blocks may form the basic compression unit that is used and synchronised using the technology described herein, e.g. during compression and decompression.

In this case, in one set of embodiments, a (and each) block (when uncompressed) corresponds to an integer number of cache lines of the cache that is associated with the data encoder, e.g. 4 or 8 cache lines. (Thus, in the case of 64 byte cache lines, each data block in its uncompressed form may, e.g., comprise and be stored as a 256 or 512 byte block of data.)

In this case, respective sets of plural such blocks are in an embodiment grouped together, in an embodiment with an associated (and in an embodiment correspondingly sized) "header" block, as respective "page" of the memory system.

Thus, for example, a 4 kB page in memory may be split into fifteen 256 B "payload" blocks of data (for graphics processing operations), and a 256 B header.

A given data array (e.g.) may then be divided into and stored as one or more (e.g. a plurality of) such pages (e.g. of size 4 kB) in the memory system, e.g. as an output buffer.

Organising the data blocks with respective header blocks in memory pages in this manner may help, for example, to simplify the physical addressing that needs to be used in relation to the data blocks, etc., in memory.

Other sizes of memory pages and blocks would, of course, be possible. For example, a block of data (when uncompressed) may correspond to any suitable and desired (e.g. integer) number of lines in the cache.

The header for a set of data blocks (memory page) can store any suitable and desired header data that may be appropriate for the set of data blocks.

Thus the header (and the header data) for the set of plural data blocks may, and in an embodiment does, comprise, one or more of, and in an embodiment all of: for each data block of the set of data blocks an indication of whether the data block is stored in the memory in a compressed format or not; for each data block of the set of plural data blocks, any required compression parameters/state, such as an indication of the compression format that has been used for the data block; and for each data block of the set of plural data blocks, an indication of the number of memory transactions (bursts) that will be needed to read the (compressed) data from the memory for the data block in question (this may be appropriate where a variable rate compression scheme is being used, so it is desirable to indicate how much data needs to be fetched from the memory for each individual data block).

In one set of embodiments the data encoder is configured to encode and decode data using the compression techniques described in the Applicant's U.S. Pat. No. 8,542,939 B2, U.S. Pat. No. 9,014,496 B2, U.S. Pat. No. 8,990,518 B2 and U.S. Pat. No. 9,116,790 B2. In one set of embodiments the data encoder is also or instead (and in an embodiment also) configured to encode and decode data using a fixed rate compression technique.

The data encoder can be included in the cache system and associated with the cache (the cache level) in question in any suitable and desired manner.

As discussed above, when the cache system comprises multiple cache levels, the data encoder may be associated with any suitable and desired (single) level of the cache system and in one set of embodiments the data encoder is associated with the L2 cache.

In one set of embodiments the data encoder is integrated (e.g. directly) with the cache (the cache level) itself, e.g. the cache itself comprises the data encoder. Thus the, e.g. L2, cache may comprise the data encoder.

Where the cache (cache level) is provided as plural respective "physical" caches (as a set of plural cache "slices") then in one set of embodiments each respective cache "portion" (slice) is associated with a (and has its own) respective data encoder for that cache portion (slice). For example, the (e.g. L2) cache may comprise a plurality of portions (slices), e.g. each configured to receive data from the memory system and to provide data to the graphics processor for use when performing graphics processing operations and to receive data from the graphics processor for sending to the memory system, with each of the plurality of portions (e.g. slices) of the (e.g. L2) cache comprising a respective (its own) data encoder.

Thus, in one set of embodiments, the cache system comprises a plurality of data encoders associated with a respective plurality of portions (e.g. slices) of the (e.g. L2) cache.

In one set of embodiments, where the cache system comprises an (e.g. asynchronous switch network (ASN)) interconnect arranged to interface between the cache (e.g. the L2 cache) and the graphics processor (the processing core(s) of the graphics processor) (e.g. to control the data being transferred in and out of the cache), the data encoder is associated (e.g. integrated) with the interconnect (e.g. instead of incorporating the data encoder into the cache itself). Thus the interconnect may comprise the data encoder. In this case there may be a single data encoder integrated with the interconnect that is shared by all the cache "slices".

The data encoder is configured to decode and encode the data being read into and written from the cache respectively, e.g. in response to requests to the cache system made by the graphics processor when performing graphics processing operations.

When data is required to be read in from memory for a graphics processing operation being performed by the graphics processor, a read request for that data may thus be issued to the cache system. That is, the read operation will proceed via the cache system.

In the case that the data is already available in the cache (that is associated with the data encoder) (there is a cache "hit"), the graphics processor will use the data from the cache without having to go back towards the (main) memory system for the data.

On the other hand, when a read request is issued for some data to be read by the graphics processor, and the data is not present (already stored) in the cache (that is associated with the data encoder) (there is a cache "miss"), the data needs to be read (fetched) into the cache from the memory system (or higher (closer to the memory) in the cache hierarchy). In this case, the data encoder will be triggered to, and operate to, fetch the data from the memory system (or higher in the cache hierarchy) and store it in the cache for use by the graphics processor.

In one set of embodiments the data is read into the cache (from the memory system) as a whole block of data (e.g. even when only some of the data in the block of data is required (has been requested by) by the graphics processor).

As will be appreciated, reading a whole (e.g. compressed) block of data from the memory system (or higher in the cache hierarchy) is particularly appropriate when the data is compressed and stored in the memory system in a block-based manner.

Thus, the method may comprise (and the data encoder or graphics processor may be configured to) identifying the (particular) block of data in which the requested data is located, and fetching the entire block of data (from the memory system) into the cache. The block of data may be registered for (potential) decoding with the data encoder.

This helps to maintain synchronisation of the (e.g. compressed) blocks of data. For example, reading in and storing the data in the cache as a whole block (or full line(s)) of data, means that when it comes to writing (e.g. evicting) the data to the memory system, the whole block (or full line(s)) of data is available together for encoding as a whole block.

In one set of embodiments, the method comprises (and the data encoder is configured to), when data (that has been requested) is stored in a compressed format in the memory system (the data encoder) reading the (entire) compressed block of data (that contains the required data) from the memory system (or higher in the cache hierarchy), decoding (decompressing) the compressed block of data, and writing (e.g. performing line fill operation(s) to store) the block of data (in the uncompressed format) into the cache. This operation in an embodiment comprises the data encoder (temporarily) storing (buffering) the data locally whilst it decodes the data (and before the data is written to the cache).

Thus it will be seen that in some embodiments the decoding of the data is performed as part of the line fill operation into the cache, by the data encoder that is associated with the cache.

In one set of embodiments the data in the uncompressed format is written into a plurality of lines in the cache. Thus multiple line fill operations may be performed to store the uncompressed data in the (e.g. L2) cache. (It should be noted that the number of lines of uncompressed data in the cache will typically be greater than the number of lines of compressed data in the memory system.)

For a block of data that is stored in an uncompressed format in the memory system, the block of data may simply be read from the memory system and stored in the cache (e.g. as a whole block) as it is (as there will be no need to first decompress that data), e.g. by being written into the appropriate number of lines of the cache (using the appropriate number of line fill operations).

Thus, the method may comprise (and the data encoder may be configured to) determining whether a block of data is stored in a compressed format in the memory system, and when reading the data into the cache, decoding the data or not, as appropriate. Determining whether a block of data is stored in a compressed format in the memory system may comprise reading (the appropriate information in) header data for the block of data, i.e. determining from the header data whether the block of data is stored in a compressed format in the memory system.

Once the data has been stored in an uncompressed format in the (e.g. L2) cache, any subsequent access to the (e.g. lines in the) cache will access the uncompressed data.

When data is to be read into the cache from the memory system, the method in an embodiment also comprises (and the data encoder is configured to) reading the header data for the block of data that is required (e.g. the header data block that is associated with the set of data blocks that the required data block belongs to).

The header data is in an embodiment read to derive appropriate information about the block of data to be fetched, such as, as discussed above, whether it is stored in a compressed form (and if so, what form of compression has been used). It is in an embodiment also determined from the header data the number of memory transactions that will be required to fetch the data for the data block (so as to trigger and use that indicated number of memory transactions to fetch the data for the block).

In an embodiment, when a header data block is read from the memory, that header data (block) is cached locally to the data encoder (e.g., and in an embodiment, in the cache that is associated with the data encoder), so that that header data will be available for the data encoder for the block in question and for any other blocks that belong to the set of plural blocks that the block in question belongs to. The data encoder, etc., can then use the locally stored header data to determine information about other blocks of data that it may need to fetch from the memory that belong to the same set of plural blocks of data, and/or to determine how the data block should be written back to the memory when that is to take place.

The header data (block) can be cached locally to the data encoder in the cache that is associated with the data encoder in any suitable and desired manner. In an embodiment there is a separate header cache that is maintained by the data encoder for this purpose. In the case where there are plural data encoders, for example, where the cache (e.g. the L2 cache) that is associated with the data encoder comprises multiple cache "slices", each having its own data encoder, then the header data is in an embodiment cached in plural, and in an embodiment in each data encoder, with header updates triggered by one encoder (cache slice) then being communicated to the other data encoders (cache slices) over an appropriate interconnect (e.g. the interconnect that interfaces between the cache and the processing cores of the graphics processor).

Subject to the operation in the manner of the technology described herein, the operation fetching data from the memory system into the cache can otherwise proceed in any suitable and desired manner, such as, and in an embodiment, in accordance with the mechanism for such operations in the graphics processor and graphics processing system in question. Thus, for example, the data fetching process may first comprise allocating an appropriate line or lines in the cache to receive the data (and stalling the read request operation until an appropriate line or lines have been allocated to receive the data in the cache).

In the case where data is to be written back from the graphics processor to the cache (that is associated with the data encoder) (e.g. after having been modified by the graphics processor) (i.e. when a write request is issued for some data to be written back from the graphics processor to the cache), then that operation can proceed in any suitable and desired manner, such as, and in an embodiment, in accordance with the mechanism for such operations in the graphics processor and graphics processing system in question.

Thus, when an entry (e.g. a cache line) for the data is already present in the cache (i.e. there is a "hit" for that data in the cache), the data may just be written to the (e.g. previously allocated line(s) of the) cache.

Correspondingly, when an entry (e.g. a cache line) for the data to be written is not already present in the cache (i.e. there is a cache miss for writing that data in the cache), then the write operation may wait for a line to be allocated for the data, before then writing the data to the cache.

In an embodiment, when an entry (e.g. a cache line) for the data is not already present in the cache (i.e. there is a cache miss for that data in the cache), and the data to be written from the graphics processor to the cache is a complete block of data (e.g. corresponding to a compressed block of data as stored in the memory system), the appropriate line(s) of cache are allocated and the data written to the (allocated line(s) of the) cache. Such data in the cache may (subsequently) be encoded and written back to the memory system in a compressed format.

On the other hand, in the case where data to be written to the cache from the graphics processor is only part of a block of data (e.g. not corresponding to a whole block of compressed data as stored in the memory system), and there is a "write" miss for that data in the cache (i.e. there are not already lines allocated for storing that data in the cache), then, in an embodiment, at least in the case where the block of data may be subjected to external snooping (e.g. for cache coherency purposes), the data that is to be written to the cache from the graphics processor is first combined (by the data encoder) with the remaining data for the block of data in question (which remaining data may be, and is in an embodiment appropriately fetched from the memory system when it is not already present in the cache), before then writing a complete version of the block (including the new data for the block from the graphics processor) appropriately to the cache (in an appropriate line or lines of the cache) (in an uncompressed format).

This will then provide read-modify write behaviour for the entire data block when stored in the cache and that a complete data block (as modified by the new data written by the graphics processor) is present in the cache. This should then, e.g., avoid any external snoop transactions for the data in the block to the cache being dependent on external reads (i.e. outside of the cache) (which could lead to, for example, deadlocking of the interconnect), and so further help to ensure system coherency.

This operation of combining new data to be written to the cache with existing block data to provide a complete (modified) block of data in the cache is in an embodiment at least used in the case where the block of data may be subject to cache snooping (i.e. may be maintained in other caches, etc. of the graphics processing system such that cache coherency needs to be maintained). However, it need not be necessary in the case where the data in the cache will not be subject to any (external) snooping.

Thus the write operation may, if desired, when writing data to the cache from the graphics processor for which an entry for the data is not already present in the cache (i.e. there is a cache miss for that data in the cache), first determine whether the data is data that could be subject to snooping (external read transactions) (with the data then either being written into the cache and combined with other data for the data block in question in the manner discussed above in the case that it is determined that the data block could be the subject of snooping (external read transactions), or the new data from the graphics processor simply being written to a (newly allocated) cache line entry (cache line)

in the cache without combining it with other data for the data block, in the case that it is determined that the data could not be subject to an external read transaction (snoop)).

Whether a block of data could be subject to snooping, etc., could be, and is in an embodiment, indicated by metadata for (associated with) the data, e.g. in the MMU page tables.

Thus, in one set of embodiments, when the data to be written to the cache from the graphics processor is only part of a block of data (i.e. not corresponding to a whole block of compressed data as stored in the memory system), the method comprises (and the data encoder is configured to) (the data encoder) reading the block of (e.g. compressed) data (containing data corresponding to the data to be written to the cache) from the memory system, decoding the compressed block of data (when necessary), combining the (e.g. decompressed) block (line(s)) of data with the data to be written to the cache from the graphics processor, and writing the so-modified block (line(s)) of data (in an uncompressed form) into the cache. For example, the data may be combined by taking the data to be written to the cache from the graphics processor and combining it with the remaining data from the block (or line(s)) of data, to form a whole block (or full line(s)) of data for writing into the cache. The (new) data from the graphics processor and the data fetched from the memory system may be temporarily stored (buffered) by the data encoder before it is "combined" and written to the cache.

When data is to be written back from the cache (that is associated with the data encoder) to (towards) the memory system (i.e. data in a line or lines of) the cache (that is associated with the data encoder) has been selected for eviction from the cache), then, subject to the particular operation in the manner of the technology described herein (which will be described in more detail below), that operation can otherwise be performed in any suitable and desired manner, e.g., and in an embodiment, in accordance with the normal cache eviction process for the graphics processor and graphics processing system in question.

(It will be appreciated that the operation of writing data back to the memory system from the cache incorporates writing that data to a higher level in the cache hierarchy (where present) (i.e. to a cache level that is closer to the memory system), and so on through the cache hierarchy, as appropriate, until the data is stored in the memory system itself. The operation need not necessarily (or ever) result in the compressed data reaching the memory system, e.g. where that data can be cached at another, higher level in the cache hierarchy, and used therefrom, without the need for it to immediately or ever reach the memory system itself.)

As discussed above, in an embodiment, cache lines can be marked as needing to be handled by the data encoder or not. In this case, when a cache line is selected for eviction from the cache, then it is in an embodiment first checked whether the cache line is marked as to be handled by the data encoder or not. If not, then the cache line can be evicted in the normal manner. On the other hand, if the cache line is marked as to be handled by the data encoder, then the data encoder will handle the eviction operation in the manner of the technology described herein.

In the latter case (in this eviction operation), when data (a line or lines) in the cache (that is associated with the data encoder) is selected for eviction, it is in an embodiment first determined (e.g. by the data encoder) whether the data that is being evicted is to be stored in the memory system in a compressed or uncompressed format. This may be, and is in an embodiment, determined from the header data that is associated with the data (the data block that the data in question belongs to).

In the case that the data that is to be evicted from the cache (that is associated with the data encoder) is to be stored in the memory in an uncompressed format, then that data may be, and is in an embodiment, read from the cache and written from the cache towards the memory system (i.e. into the next level of cache hierarchy (and so on), or to the memory system directly, depending upon how the cache system is configured) as it is (as there will be no need to first compress that data.)

In this case (i.e. the data is to be stored in the memory in an uncompressed form) then the data may be, and in an embodiment is, written back as individual cache lines (i.e. without the need to ensure that an entire block of data is written back to the memory).

On the other hand, at least in the case where data to be evicted from the cache that is associated with the data encoder (i.e. to be written back to the memory system from the cache) is to be stored in the memory in a compressed format, then in one set of embodiments, the data is written back from the cache to the memory system (towards the memory system) as a complete block of data (i.e. corresponding to a (complete) compressed block of data stored in the memory system). Accordingly, in the case where a line or lines of the cache that is associated with the data encoder are selected for eviction, and the data is to be written back in a compressed form, the eviction and write-back operation will in an embodiment operate to write-back the entire block of data that includes the lines selected for eviction, even if not all the cache lines storing data for the block in question are selected for eviction (or even present in the cache).

Thus, in an embodiment, in the case where data to be evicted from the cache that is associated with the data encoder is to be stored in the memory in a compressed format, that data is always written back from the cache to the memory system as complete blocks of data (i.e. corresponding to complete compressed blocks of data stored in the memory system).

This helps to maintain synchronisation of the compressed blocks of data in the memory system, by ensuring that complete compressed blocks of data are only ever written back to the memory system.

Thus, when (e.g. a line of) uncompressed data is to be evicted from the (e.g. L2) cache (and written back to the memory system in a compressed form), in a set of embodiments the method comprises (and the data encoder is configured to) writing a whole block of data (e.g. corresponding to a whole compressed block of data as stored in the memory system) containing the data to be evicted back to the memory system (i.e. instead of just evicting the particular (e.g. line of) data that is desired to be evicted).

In this case, even if only a single line or fewer than a complete set of lines for a data block is selected for eviction from the (e.g. L2) cache to be written back to the memory system, the data encoder will operate to write whole block data (corresponding to a whole compressed block of data as stored in the memory system) back to the memory system.

In these embodiments, in the case where the data (lines) selected for eviction from the cache comprise a complete block of data that is to be compressed, the data encoder accordingly in an embodiment reads the data (the lines) corresponding to the complete block of data from the cache, compresses that data (cache lines) to provide a compressed block of data and writes the compressed block of data back to the memory system.

In this case, the data encoder will in an embodiment first determine whether all of the data needed to generate the compressed block to be written back to the memory system (i.e. including the data (line) that has actually been selected for eviction) is present in the cache. If so, then the data encoder can, and in an embodiment does, simply read all the data (all the cache lines) required for the block from the cache (even if not all that data is selected for eviction), and compress that data appropriately and write the compressed block of data back to memory.

To facilitate this operation, when data (e.g. a line or lines) is selected and indicated to be evicted from the cache that is associated with the data encoder, the data encoder will in an embodiment operate to try to read from the cache all the cache lines necessary to provide the complete block of data that includes the data (e.g. line) to be evicted. As a result of this read operation, the data encoder accordingly will get a "hit" in the cache for any lines for the block that are present in the cache, but will get a "miss" in the cache for any lines for the block that are not present in the cache. This will then allow the data encoder to, in effect, determine whether all the data for the block to be compressed and written back to the memory system is present in the cache or not.

In the case where not all the data corresponding to a complete data block is present in the (e.g. L2) cache, then in order to be able to write an entire block of data back to the memory (including the data being evicted from the cache), the data encoder in an embodiment operates to read the corresponding block of data from the memory and to decode (decompress) that block of data from memory, before then combining the data read from the memory system with the new data being evicted from the cache, to thereby provide a modified set of data for the block which is then encoded (compressed) to provide a new, complete, compressed block of data to be written back to the memory (which the data encoder then writes back to the memory).

In this case therefore, the data encoder will, in effect, generate a new block of data to be compressed, comprising data read from (and to be evicted from) the cache, together with some data for the block that is read from the version of the data block that is stored in the memory system. This will then allow a complete block of data to be compressed and written back to the memory by the data encoder, even in the case where only some but not all of the block is stored in the cache.

In this case, the block of data that is read from the memory and used in part to combine with the data that is being evicted from the cache could be written into the cache, but in an embodiment that data is not written into the cache, but is instead stored locally to the data encoder (e.g., and in an embodiment, in an appropriate local buffer of or available to the data encoder) for combining with the data from the cache.

Thus, in this case, the data encoder will read some uncompressed data for the block to be encoded from the cache and store it in its local storage (e.g. buffer), and correspondingly read the entire block from the memory system, decompress that block and store the decompressed data read from the memory system in its local storage, e.g. buffer, and then read the appropriate new data and data from the memory system from the buffer to generate a new version of the block for compressing and writing back to the memory system (which version may again temporarily be stored in the local storage of the data encoder before being written back towards the memory system, if desired).

To facilitate this operation, as discussed above, the data encoder in an embodiment operates to try to read all the data (all the lines) needed for the complete block of data from the cache, and then determines whether the complete block of data is present in the cache based on whether any of the data (lines) attempted to be read from the cache were not present in the cache (i.e. whether there was any data (line) miss in the cache or not).

Any lines of data that are evicted from the cache are in an embodiment invalidated (once they have been read by the data encoder), so that they are then available for allocation for storing new data.

In an embodiment it is determined, e.g., and in an embodiment by the data encoder, whether any of the lines of the cache read by the data encoder for the eviction process (whether actually selected for eviction or read additionally by the data encoder as part of the eviction operation) are "dirty" (i.e. have been changed (modified) from their content as initially stored in the cache (e.g. as a result of graphics processing operations on the data by the graphics processor)).

In the case where none of the data (cache lines) to be read (evicted) have been modified (are "dirty"), then the write-back operation is in an embodiment not performed, and the lines selected for eviction are simply invalidated so as to make them available for reuse. This avoids performing the write-back operation where a copy of the (unmodified) data will already be present in the memory system.

On the other hand, if at least some of the data (one of the cache lines) read by the data encoder for eviction has been modified (is "dirty"), then the data needs to be and should be written back to the memory system, as the data in the cache will be different to the data in the memory system.

This will then allow the write-back operation to be skipped (omitted) in the case that it can be determined that the relevant data in the cache has not been modified (is not "dirty").

The eviction (write-back) process in an embodiment also comprises appropriately updating the header data (the header block) for the data (e.g. data block) that is written back towards the memory system. The header data for the block should be updated appropriately. Thus it is in an embodiment updated at least to indicate how many memory transactions are required to fetch the compressed data block that is being written back. It may also be updated to indicate additional compression state that may be needed for subsequent decode (decompress) operations, such as solid colour indications, etc.

Where the header data is cached locally as well as being stored in the memory system, then both sets of header data are in an embodiment appropriately updated.

Similarly, in the case where, as discussed above, the header data may be cached in multiple locations, then the copies of the header data are in an embodiment kept synchronised, for example by using coherent header caching. Thus the header data should be, and is in an embodiment, kept synchronised if there are multiple header caches which may store the same header data.

In an embodiment, before writing a block of data back to the memory, the data encoder determines whether the block of data (its content) is sufficiently similar to the version of the block of data that is already stored in the memory, and in the event that the block of data is determined to be sufficiently similar to the version of the block of data that is already stored in memory, does not write the new block of data back to the memory (and simply discards the block), On the other hand, when it is other than (it is not) determined that the block to be written back is sufficiently similar to the version of the block that is already stored in the memory, then the new block should be written back to the memory as discussed above.

The Applicants have recognised in this regard that even when a new version of (some or all of) a block of data is generated by the graphics processor, it can be the case that that new data is in fact the same as the block of data as currently stored in the memory system. For example, in the case of a user interface (UI), it may be that newly generated blocks of data simply match previously generated blocks of data for the frame. Furthermore, even if the data for the block has been modified (is "dirty"), it can be the case that the "dirty" block still matches, and is the same as, the block that is stored in the memory. In this case therefore, the new data generated by the graphics processor will be the same as the block as already stored in the memory, and so there would, in fact, be no need to write the newly generated block back to the memory. These arrangements address and exploit this, by comparing the new block of data to be written back to the memory to the version of the block of data that is already stored in the memory.

This can further help to reduce unnecessary writing back of blocks to the memory system (memory transactions) in the case where it can be determined that the (correct) data for the block is already present in the memory system.

This operation can be configured in any suitable and desired manner. In an embodiment it is configured in the manner of the Applicant's earlier U.S. Pat. Nos. 9,881,401, 9,406,155, 8,988,443 relating to the elimination and reduction of the memory transactions using such techniques.

Thus, in an embodiment, a suitable content-representative signature (such as a CRC (cyclic redundancy check)) is generated for a block that is to be written back to the memory (in an embodiment by the data encoder), and then compared to corresponding content-representing signature (e.g. CRC) for the version of the block that is already stored in the memory, to see if the signatures match (or at least sufficiently match) or not, with the block being determined to be sufficiently similar to the existing version of the block that is already stored in the memory in the event that the respective block's signatures match (or at least sufficiently match).

To facilitate this operation, in an embodiment, an appropriate content-representative signature (e.g. CRC) is stored for each block. This could, e.g., be stored in a separate "signature" buffer, or with the header data for the block. Thus, where there is a header data block for a set of plural data blocks, that header data block in an embodiment stores an appropriate content-representative signature (e.g. CRC) for each block in the set of plural blocks that the header data block relates to. In this case, the "signatures" in the header data block are in an embodiment stored separately to other header data that is stored for the blocks of the set of blocks in the header data block, so as to then allow, e.g., the "signatures" to be read and written separately to the rest of the header data.

Correspondingly, when a new content-representative signature (e.g. CRC) is generated for a data block that is then written back to the memory, the corresponding signature for that data block, e.g. in the signature buffer or header data block, is in an embodiment updated accordingly.

It would also be possible to compare a block of data to be written back to memory to other blocks of data, as well as the corresponding block of data, that is stored in the memory. For example, the new block of data to be written back to the memory (its content) could be compared to the other blocks in the set of plural blocks that it shares a header data block with (as well as being compared with the version of the block itself that is stored in the memory). This would then potentially allow more block "matches" to be identified.

In this case, in an embodiment, the content-representative signature (e.g. CRC) generated for a block that is to be written back to the memory is compared to the content-representative signatures for plural other blocks, e.g. the other blocks in the set of plural blocks that it shares a header data block with (i.e. with the content-representative signatures that are stored in the header data block for the set of data blocks), to determine if the new block that is to be written back to the memory is sufficiently similar to another block that is stored in the memory or not. In this case therefore, the blocks will be tested for similarity, e.g. within the set of blocks that are stored and grouped together as a set of plural data blocks with a common header data block (e.g., and in an embodiment, as a memory page).

In these arrangements, when it is determined from the signature comparisons that a block of data is sufficiently similar to a block of data that is already stored in the memory other than the block of data itself, that is in an embodiment noted and recorded, e.g. in the header data for the block of data in question (e.g. for the set of plural data blocks that the block of data in question belongs to). For example, and in an embodiment, the header data could record that the block is similar to another block, and indicate the identity of that another block that should be used as the block in question.

Other arrangements would be possible, if desired.

As will be appreciated from the above, the technology described herein is, in an embodiment, implemented in a system comprising a memory system, a cache system, and a graphics processor (a graphics processing unit (GPU)). Data for performing graphics processing operations (e.g. to generate a render output (e.g. image to be displayed)) is, in an embodiment, stored in a memory of the memory system. The graphics processor is, in an embodiment, arranged to trigger the fetching of required data from the memory and its storing in the cache system, in the manner described above. The graphics processor then, in an embodiment, reads required data from the cache system for performing graphics processing operations (e.g. generating the render output), e.g. in the manner described above. The output from the graphics processing operations (e.g. the render output), once generated in this way, is then written back to the memory system via the cache system, and, in an embodiment, displayed, e.g. on a display of an electronic device, such as a phone, tablet, television, computer screen or the like.

The graphics processor (graphics processing unit) may, and in an embodiment does, implement and execute a graphics processing pipeline to perform graphics processing operations.

The graphics processing pipeline may include, and in an embodiment does include, any one or more, and in an embodiment all, of the processing stages that a graphics processing pipeline may normally include, such as, and in an embodiment, a primitive setup stage, a rasteriser, a renderer (in an embodiment in the form of or including a programmable fragment shader (a shader core)).

In an embodiment, the graphics processor (processing pipeline) also comprises one or more programmable shading stages, such as one or more of, and in an embodiment all of, a vertex shading stage, a hull shader, a tessellation stage (e.g. where tessellation is performed by executing a shader program), a domain (evaluation) shading stage (shader), a geometry shading stage (shader), and a fragment shader.

The graphics processor (processing pipeline) may also contain any other suitable and desired processing stages that a graphics processing pipeline may contain such as a depth (or depth and stencil) tester(s), a blender, a tile buffer or buffers, a write out unit etc.

In an embodiment, the graphics processing system includes a host processor that executes applications that may require graphics processing by the graphics processor. In an embodiment the system further includes appropriate storage (e.g. memory), caches, etc., as described above The technology described herein may be used in and with any suitable and desired graphics processing system and processor.

As one example, the technology described herein may be used with tiled renderers (tile-based graphics processing systems). Thus, in an embodiment, the graphics processor (processing pipeline) is a tiled-based graphics processor (processing pipeline). However, other arrangements would of course be possible.

Although the technology described herein has been discussed above with particular reference to cache operations in relation to a graphics processor in a graphics processing system, the Applicants have recognised that the use of a data encoder associated with a cache in the manner discussed above would be useful in other cache arrangements and systems, and not just in the context of graphics processors.

For example, it could be advantageous to integrate a data encoder in the manner of the technology described herein with a system cache. That would then allow sharing data between units connected to the same system cache, such as a graphics processor, a display processor (DPU) (display processing unit), a video processor (VPU) (video processing unit), and an image signal processor (ISP), with the system cache presenting data to the main memory system in compressed form, but uncompressed to the various processors (masters) connected to the system cache.

For example, in the case of a display processor, the display processor could request data for a compressed block from the system cache, with the system cache and associated data encoder then operating in the manner of the technology described herein to read the compressed data block from the memory system, decode the block and provide the decoded block to the display processor. In this case, the system cache may not need to retain a cached copy of the decompressed block once it has been provided to the display processor (e.g. in the case where the display processor is simply streaming the data for display).

It is accordingly believed that the operation and system in the manner of the technology described herein when used in data processing systems more generally may be new and advantageous in its own right.

Thus, another embodiment of the technology described herein comprises a data processing system comprising:
    a memory system;
    a processor; and
    a cache system configured to transfer data stored in the memory system to the processor for use by the processor when performing data processing operations and to transfer data from the processor to the memory system;
    the cache system comprising:
        a cache configured to receive data from the memory system and to provide data to the processor for use when performing processing operations and to receive data from the graphics processor for sending to the memory system; and
        a data encoder associated with the cache and configured to:
            when data is to be written from the cache to the memory system, encode uncompressed data from the cache for storing in the memory system in a compressed format and send the data in the compressed format to the memory system for storing; and
            when data in a compressed format is to be read from the memory system into the cache, decode the compressed data from the memory system and store the data in the cache in an uncompressed format.

A further embodiment of the technology described herein comprises a method of operating a data processing system, the data processing system comprising:
    a memory system;
    a processor; and
    a cache system configured to transfer data stored in the memory system to the processor for use by the processor when performing data processing operations and to transfer data from the processor to the memory system;
    the cache system comprising a cache configured to receive data from the memory system and to provide data to the processor for use when performing data processing operations and to receive data from the processor for sending to the memory system, and a data encoder associated with the cache;
    the method comprising:
        when data is to be written from the cache to the memory system, the data encoder encoding uncompressed data from the cache for storing in the memory system in a compressed format and sending the data in the compressed format to the memory system for storing; and
        when data in a compressed format is to be read from the memory system into the cache, the data encoder decoding the compressed data from the memory system and storing the data in the cache in an uncompressed format.

As will be appreciated by those skilled in the art, these embodiments of the technology described herein may, and in an embodiment do, include any one or more or all of the features of the technology described herein described herein. Thus, for example, the cache that the data encoder is associated with is in an embodiment a system cache, and in an embodiment an L2 cache.

Correspondingly, the cache system (the system cache) is in an embodiment shared between multiple processors, such as a GPU, a CPU, a DPU, and/or an ISP, with the cache being able to operate in the manner of the technology described herein in respect of each of the multiple processors as appropriate.

In an embodiment, the various functions of the technology described herein are carried out on a single processing platform.

In an embodiment, the data processing system and/or processor also comprises, and/or is in communication with, one or more memories and/or memory devices that store the data described herein, and/or that store software for performing the processes described herein. The data processing system and/or processor may also be in communication with a host microprocessor, and/or with a display for displaying images based on the data generated by the processor (processing pipeline).

The technology described herein may be implemented in any suitable system, such as a suitably configured microprocessor based system. In some embodiments, the technology described herein is implemented in computer and/or micro-processor based system.

The various functions of the technology described herein may be carried out in any desired and suitable manner. For example, the functions of the technology described herein may be implemented in hardware or software, as desired. Thus, for example, the various functional elements and stages of the technology described herein may comprise a suitable processor or processors, controller or controllers, functional units, circuits/circuitry, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, etc., when desired.

Furthermore, any one or more or all of the processing stages of the technology described herein may be embodied as processing stage circuits/circuitry, e.g., in the form of one or more fixed-function units (hardware) (processing circuits/circuitry), and/or in the form of programmable processing circuits/circuitry that may be programmed to perform the desired operation. Equally, any one or more of the processing stages and processing stage circuits/circuitry of the technology described herein may be provided as a separate circuit element to any one or more of the other processing stages or processing stage circuits/circuitry, and/or any one or more or all of the processing stages and processing stage circuits/circuitry may be at least partially formed of shared processing circuits/circuitry.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments of the technology described herein will now be described in the context of a graphics processing system.

FIG. 1 shows an exemplary graphics processing system in which the technology described herein and the present embodiments may be implemented.

The exemplary graphics processing system shown in FIG. 1 comprises a host processor comprising a central processing unit (CPU) 1, a graphics processor (graphics processing unit (GPU)) 10, a video codec 2, a display controller 3, and a memory controller 4. As shown in FIG. 1, these units communicate via an interconnect 5 and have access to an off-chip memory system (memory) 6. In this system, the GPU 10, the video codec 2 and/or CPU 1 will generate frames (images) to be displayed and the display controller 3 will then provide frames to a display 7 for display.

In use of this system, an application 8, such as a game, executing on the host processor (CPU) 1 will, for example, require the display of frames on the display 7. To do this the application 8 will send appropriate commands and data to a driver 9 for the graphics processing unit 10 that is executing on the CPU 1. The driver 9 will then generate appropriate commands and data to cause the graphics processing unit 10 to render appropriate frames for display and store those frames in appropriate frame buffers, e.g. in main memory 6. The display controller 3 will then read those frames into a buffer for the display from where they are then read out and displayed on the display panel of the display 7.

As part of this processing, the graphics processor 10 will read in data, such as textures, geometry to be rendered, etc. from the memory 6, process that data, and then return data to the memory 6 (e.g. in the form of processed textures and/or frames to be displayed), which data will then further, e.g. as discussed above, be read from the memory, e.g. by the display controller 3, for display on the display 7. Thus there will need to be transfer of data to and from the graphics processor 10 (in particular to and from the processing cores of the graphics processor 10) and the memory 6.

In order to facilitate this, and to reduce the amount of data that needs to be transferred to and from memory during graphics processing operations, the data may be stored in a compressed form in the memory.

As the graphics processor 10 needs to operate on the data in an uncompressed form (and will produce data in an uncompressed form), this accordingly means that data that is stored in the memory in a compressed form will firstly need to be decompressed before being processed by the graphics processor. Correspondingly, data produced by the graphics processor 10 will first need to be compressed before being (finally) stored in the memory 6.

The present embodiments relate in particular to improved techniques for performing such compression and decompression of data between the memory 6 and the graphics processor 10.

Figure 2:
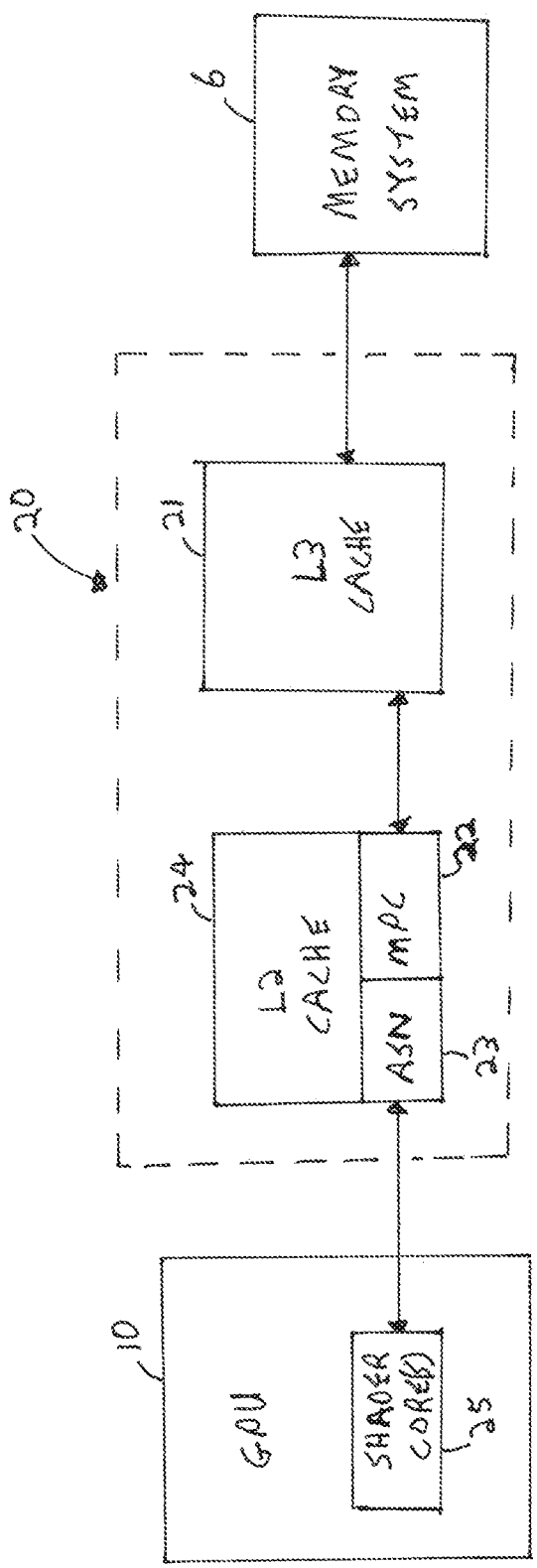
FIG. 2 shows schematically an embodiment of the technology described herein.

FIG. 2 shows schematically and in more detail the elements of the graphics processing system that are relevant to the operation of the present embodiments, and in particular to the transferring of data to and from the memory system 6 and the graphics processor 10 in a compressed form. As will be appreciated by those skilled in the art there may be other elements of the system, etc., that are not shown in FIG. 2.

FIG. 2 shows the memory system 6 and the graphics processor 10. As shown in FIG. 2, in between the memory system 6 and the graphics processor 10, there is a cache system 20 that is operable to transfer data from the memory system 6 to the graphics processor 10 (and in particular to the processing cores (shader cores) 25 of the graphics processor 10), and conversely to transfer data produced by the processing cores 25 of the graphics processor 10 back to the memory 6.

The cache system shown in FIG. 2, is illustrated as comprising two cache levels, an L3 cache 21 that is closer to the memory 6, and an L2 cache 24 that is closer to the graphics processor 10 (and from which the data is provided to the shader cores 25). Other cache hierarchy arrangements would be possible, such as comprising only a single cache level (the L2 cache), or more than two cache levels, if desired.

As shown in FIG. 2, in this embodiment data is transferred from the memory system 6 to the L3 cache 21, then from the L3 cache 21 to the L2 cache 24, and from the L2 cache 24 to the shader cores 25 (and vice-versa).

In order to facilitate the handling of compressed data from the memory system 6 (and for returning compressed data to the memory system 6) where that is required, as shown in FIG. 2, the L2 cache 24 has associated with it a data encoder 22 (in the form of a memory page compression unit (MPC)).

As will be discussed further below, this data encoder is operable to decompress data received from the memory system 6 via the L3 cache 21 before storing that data in an uncompressed form in the L2 cache 24 for use by the shader cores 25 of the graphics processor, and, conversely, to compress data that is to be evicted from the L2 cache 24 prior to writing that data back to the memory system 6 (again via the L3 cache 21). The operation of this data encoder (MPC) 22 will be discussed in more detail below.

The L2 cache 24 also includes, as shown in FIG. 2, an appropriate interconnect 23 (in this case in the form of an asynchronous switch network) for transferring data between the L2 cache 24 and the shader cores 25.

In order to facilitate operation between the L2 cache and the data encoder (MPC) 22, each cache line in the L2 cache has associated with it appropriate flags and data to indicate whether the cache line should be handled by the data encoder (MPC) 22 or not.

FIG. 11 illustrates this, and shows an exemplary set of plural cache lines 110 of the L2 cache 24, each storing respective data 111 and having a respective tag 112 identifying the data in the cache line and a set of tag state information 113, such as flags indicating whether the cache line is valid or not, is dirty or not, is free or not, etc.

In addition, as shown in FIG. 11, each cache line in the L2 cache also has an "MPC enable" flag 114 that indicates whether the cache line is to be handled and processed by the data encoder (MPC) 22 or not. Correspondingly, each cache line has a field 115 for storing any required metadata needed by the data encoder (MPC) 22 for its operations when handling the cache line, such as an indication of whether the data in the cache line is stored in the memory in a compressed or uncompressed form, and if it is compressed, the number of memory transactions needed to fetch the compressed data.

Figure 3:
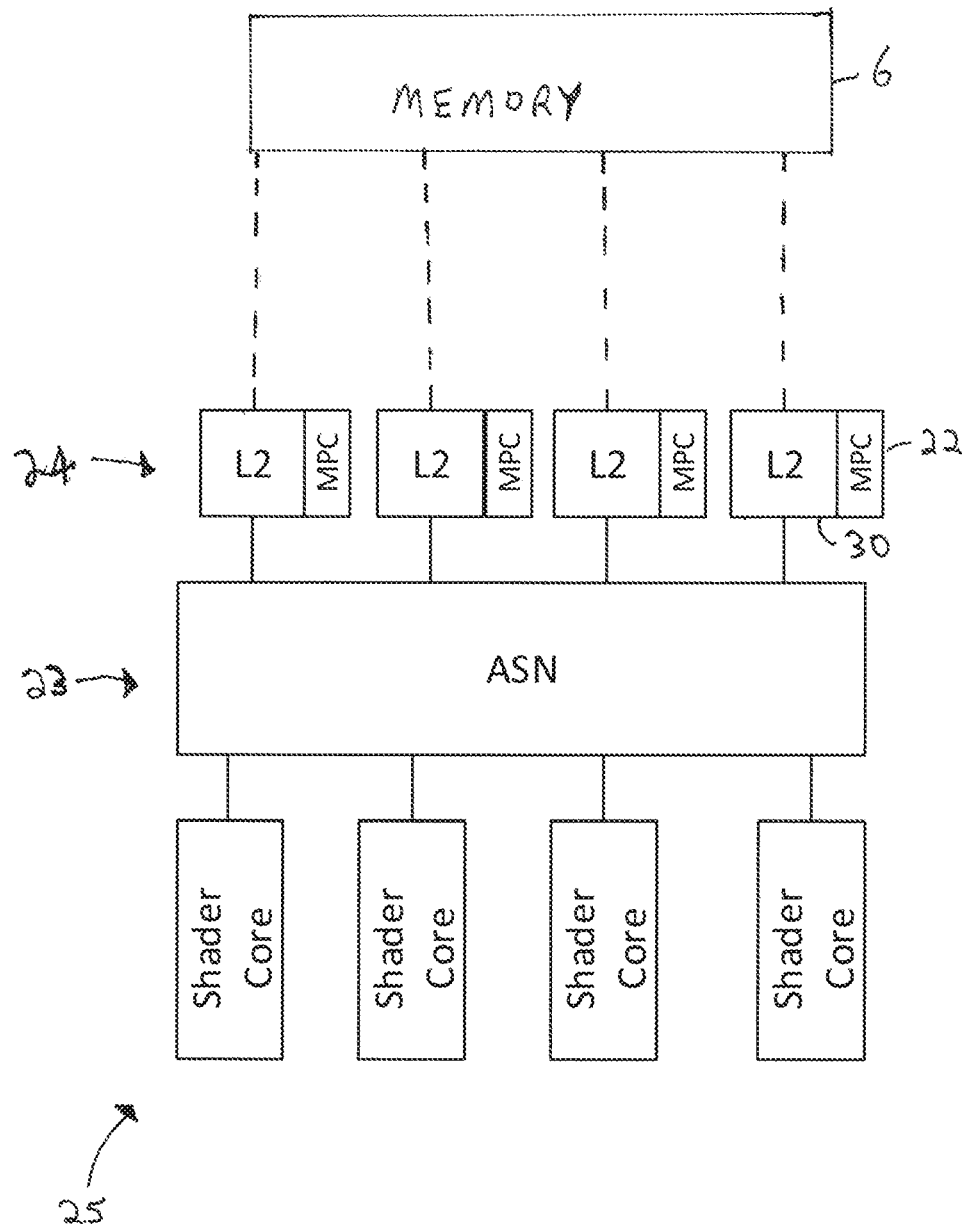
FIG. 3 shows an embodiment of the cache system of the graphics processing system of FIG. 2 in more detail.
Figure 4:
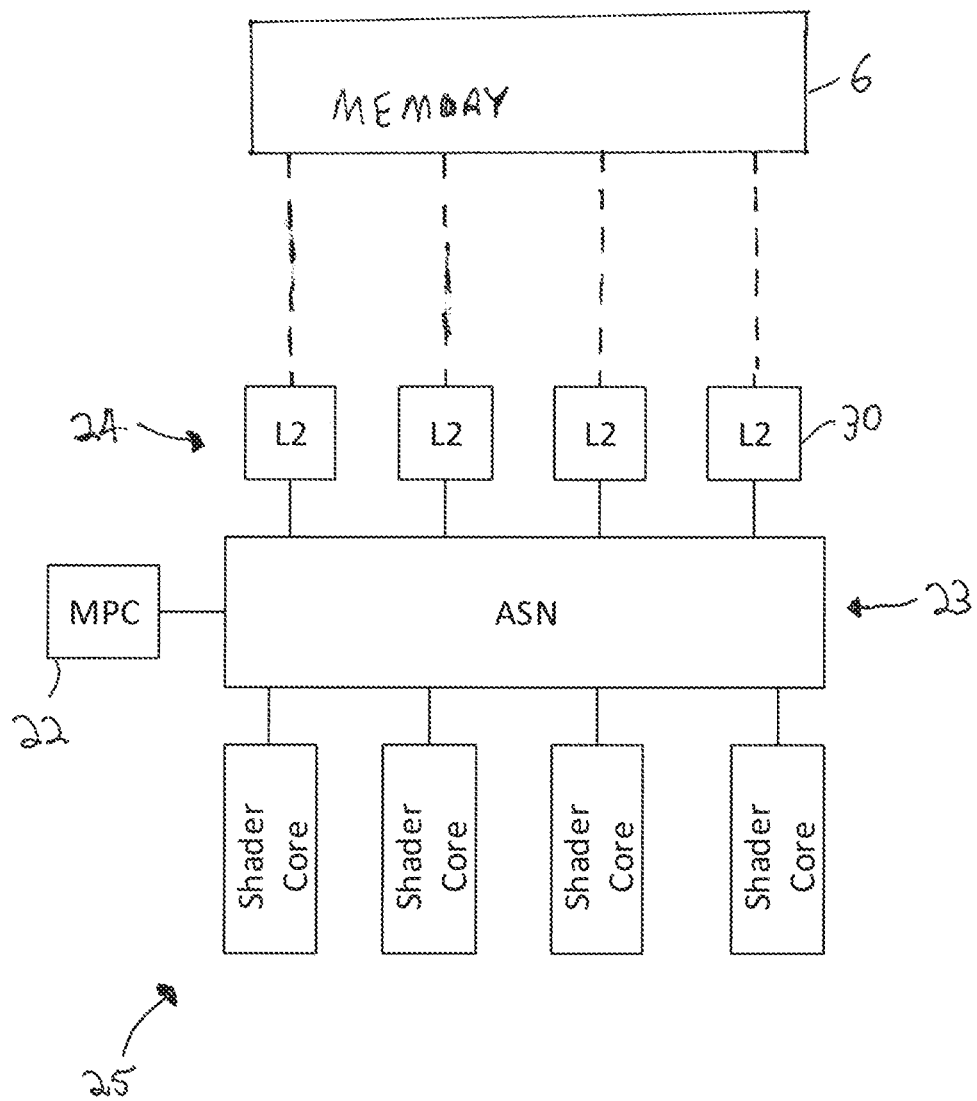
FIG. 4 shows another embodiment of the cache system of the graphics processing system of FIG. 2 in more detail.

FIGS. 3 and 4 show the arrangement of the L2 cache 24, data encoder (memory page compression unit) 22, and shader cores 25 in two possible implementation arrangements of the present embodiments in more detail.

In both FIGS. 3 and 4, the L2 cache 24 is shown as being configured as respective separate physical cache portions (slices) 30. In the arrangement in FIG. 3, each respective L2 slice has its own associated data encoder 22. In the arrangement shown in FIG. 4, rather than each L2 cache slice 30 having its own associated data encoder 22, there is a single data encoder 23 that operates for all the L2 cache slices 30 that is instead coupled to and associated with the interconnect 23 that acts between the L2 cache 24 and the shader cores 25 of the graphics processor.

Figure 5:
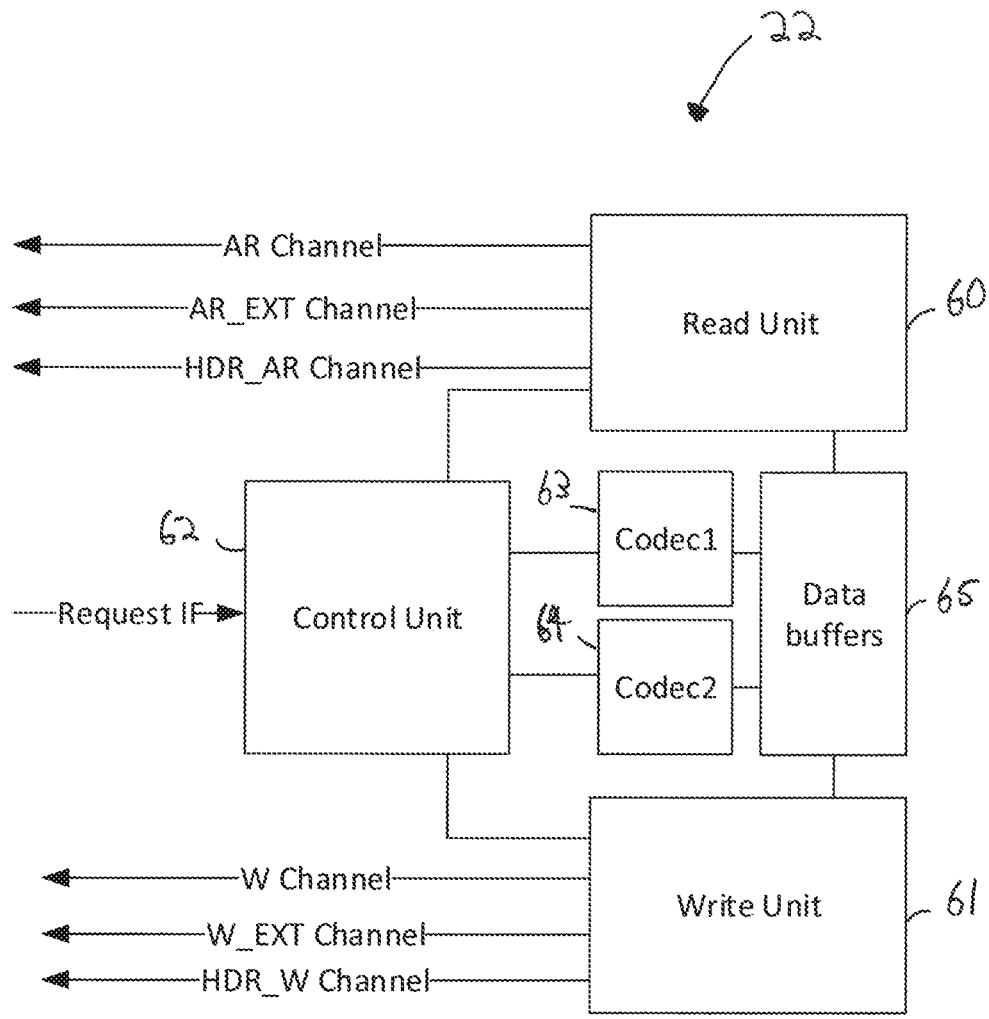
FIG. 5 shows an embodiment of the data encoder in more detail.

FIG. 5 shows an embodiment of the data encoder (memory page compression unit) 22 in the present embodiments. As shown in FIG. 5, the (and each) data encoder includes respective read 60 and write 61 units (circuits) that are operable to, respectively, read data from the L2 cache and the memory system, and write data to the L2 cache and to the memory system. The data encoder 22 also includes an appropriate control unit (circuit) 62 that receives read and write requests from the shader cores and the L2 cache controller and controls the data encoder 22 to respond to those requests accordingly and appropriately.

As shown in FIG. 5, the data encoder 22 also includes one or more codecs 63, 64 and a set of data buffers 65 for temporarily storing data in the data encoder 22 while that data is processed and/or while waiting to write that data to the L2 cache or the memory system.

The data encoder 22 can include any desired number of codecs, e.g. that are each respectively operable to perform a different encoding (compression) scheme. For example, one codec may be configured to perform an appropriate variable rate compression scheme, with the other codec being configured to perform an alternative, e.g. fixed rate compression scheme.

Other arrangements would, of course, be possible.

In the present embodiments, the data (e.g. data arrays) that are being processed by the graphics processor are stored as respective blocks of data (blocks of the data array) in the memory 6, with each data block being stored in the memory 6 in a compressed form, but being stored in the L2 cache 24 in an uncompressed form for use by the shader cores 25 of the graphics processor 10.

Figure 6:
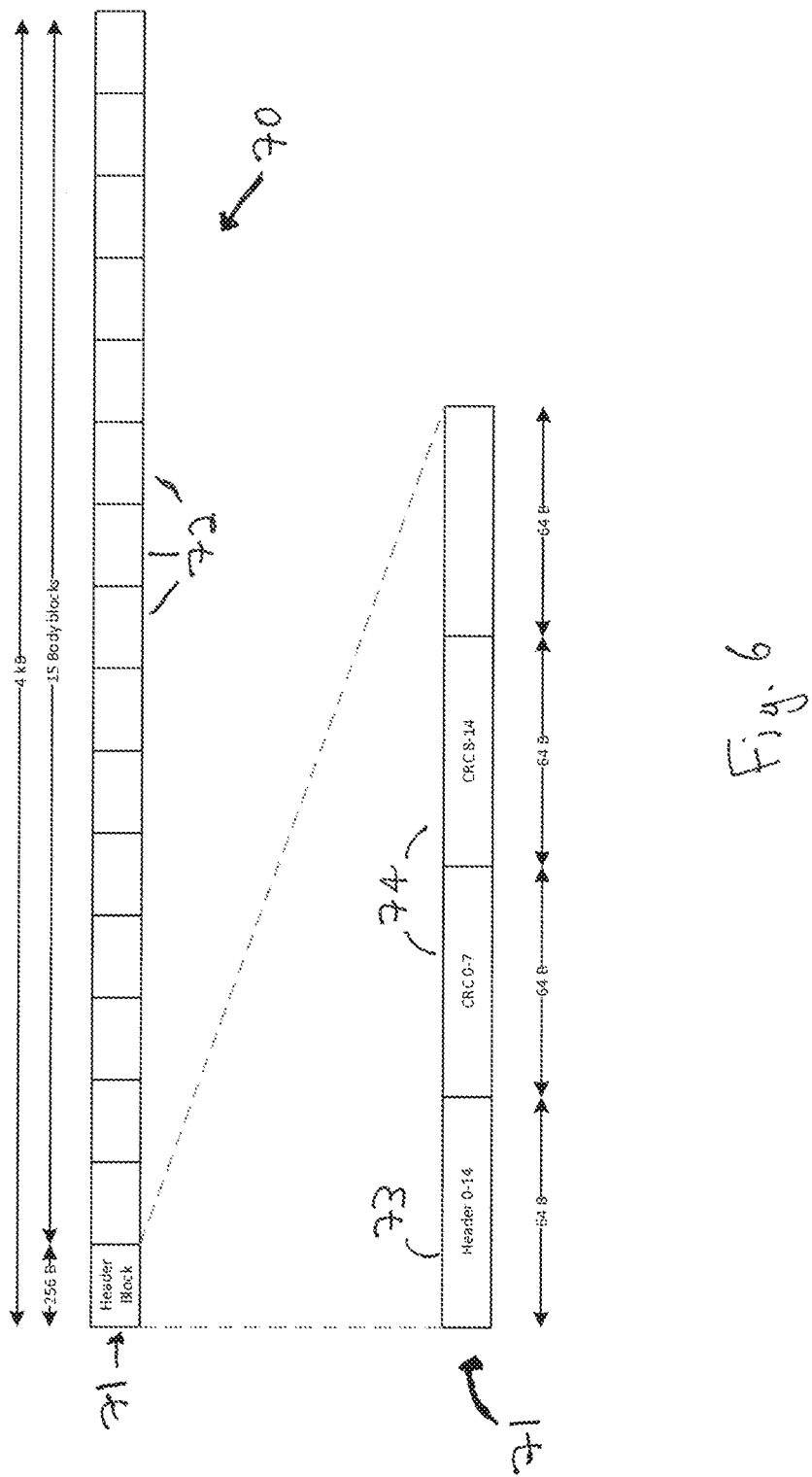
FIG. 6 shows the arrangement of data used in embodiments of the technology described herein.

To facilitate this operation, in the present embodiments the data arrays are stored and organised as respective sets of plural blocks of data which are then associated with a respective header block for the set of blocks of data in question. FIG. 6 illustrates this, and shows a set 70 of fifteen data blocks 72 that will be stored together with an associated header block 71 for the set 70 of data blocks.

In the present embodiment, in order to further facilitate operation in the manner of the technology described herein, each data block 72 corresponds in its uncompressed form to an integer number of, in this case four, cache lines of the L2 cache 24, such that in the case where each cache line comprises 64 bytes, each separate data block will comprise 256 bytes.

As shown in FIG. 6, the header block 71 correspondingly comprises four cache lines worth of data and so again comprises 256 bytes.

The fifteen data blocks together with their header block accordingly comprise a 4 kilobyte memory page (and will be stored in and fit in the same memory page). This then facilitates addressing of the data blocks, as they will all use the same single, physical memory address.

Other configurations that achieve this kind of arrangement could be used if desired, e.g. depending upon the relative cache line and memory page sizes used in the graphics processing system in question.

As shown in FIG. 6, the header block 71 for a set 70 of data blocks may include any suitable and desired header data. This may comprise, for example, an indication 73 for each respective data block of: whether that data block is stored in a compressed form (and (some) compression state needed for decoding (decompressing) the block (if desired)), and/or of how many memory transactions (bursts) will be needed to fetch the data for that block from the memory (in its compressed form). (This latter may be desirable because although each data block is configured to occupy an integer number cache lines in its uncompressed form, when compressed, particularly if using a variable rate compression scheme, the data may compress to a different (and smaller) number of cache lines (and thus corresponding memory transactions), and that may differ from block-to-block. Thus it is useful if the header block indicates how many memory transactions are needed to fetch the complete set of compressed data for a (and each) data block from the memory.)

As shown in FIG. 6, in the present embodiments, the header block 71 also includes a respective content-indicating signature 74, in the form of a CRC, for each data block that the header block relates to. The use of these signatures (CRCs) will be discussed further below.

Any other suitable and desired form of header data can also be included in the header block 71, as desired.

Figure 7:
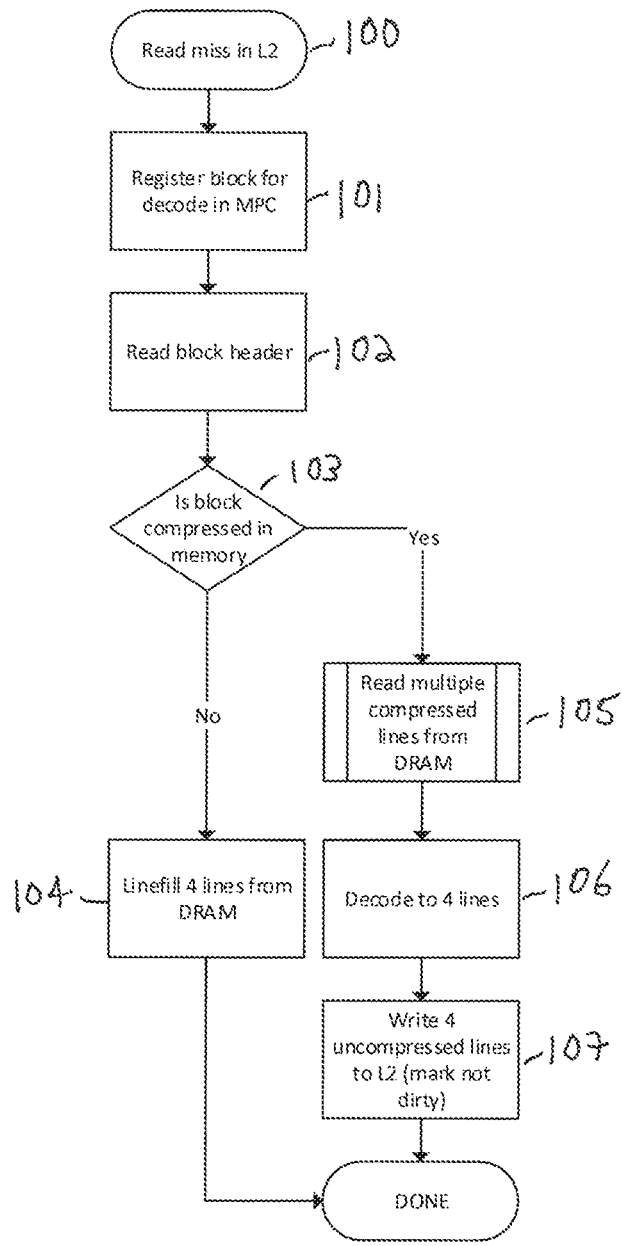
FIG. 7 is a flowchart showing the operation of reading data from the cache in an embodiment of the technology described herein.
Figure 8:
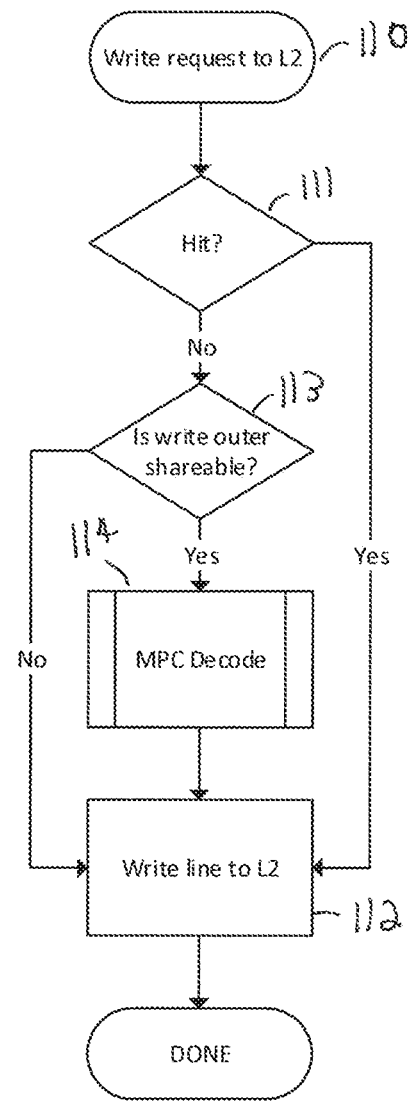
FIG. 8 is a flowchart showing the operation of writing data from the graphics processor to the cache in an embodiment of the technology described herein.
Figure 9:
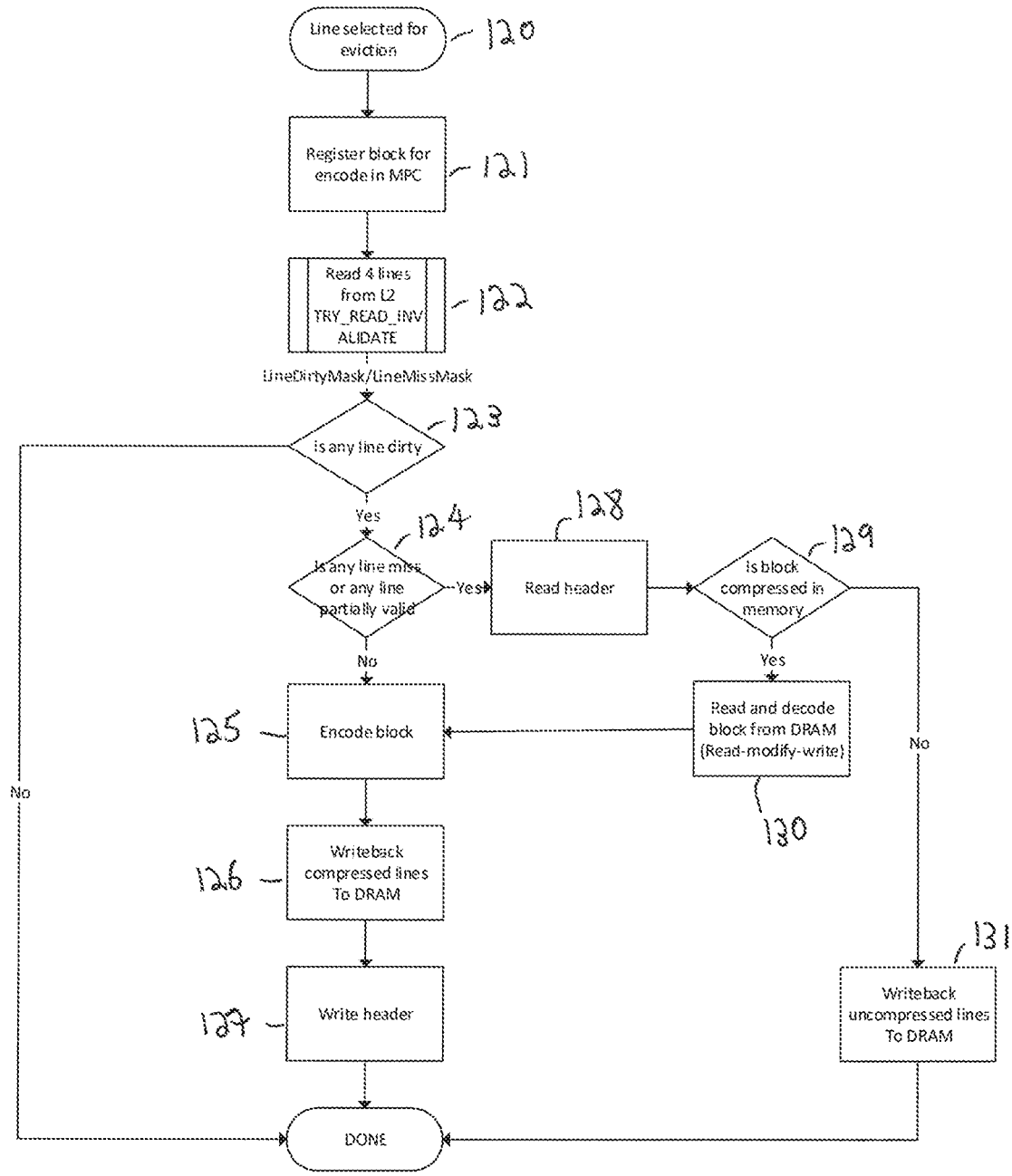
FIG. 9 is a flowchart showing the operation of evicting data from the cache in an embodiment of the technology described herein.
Figure 10:
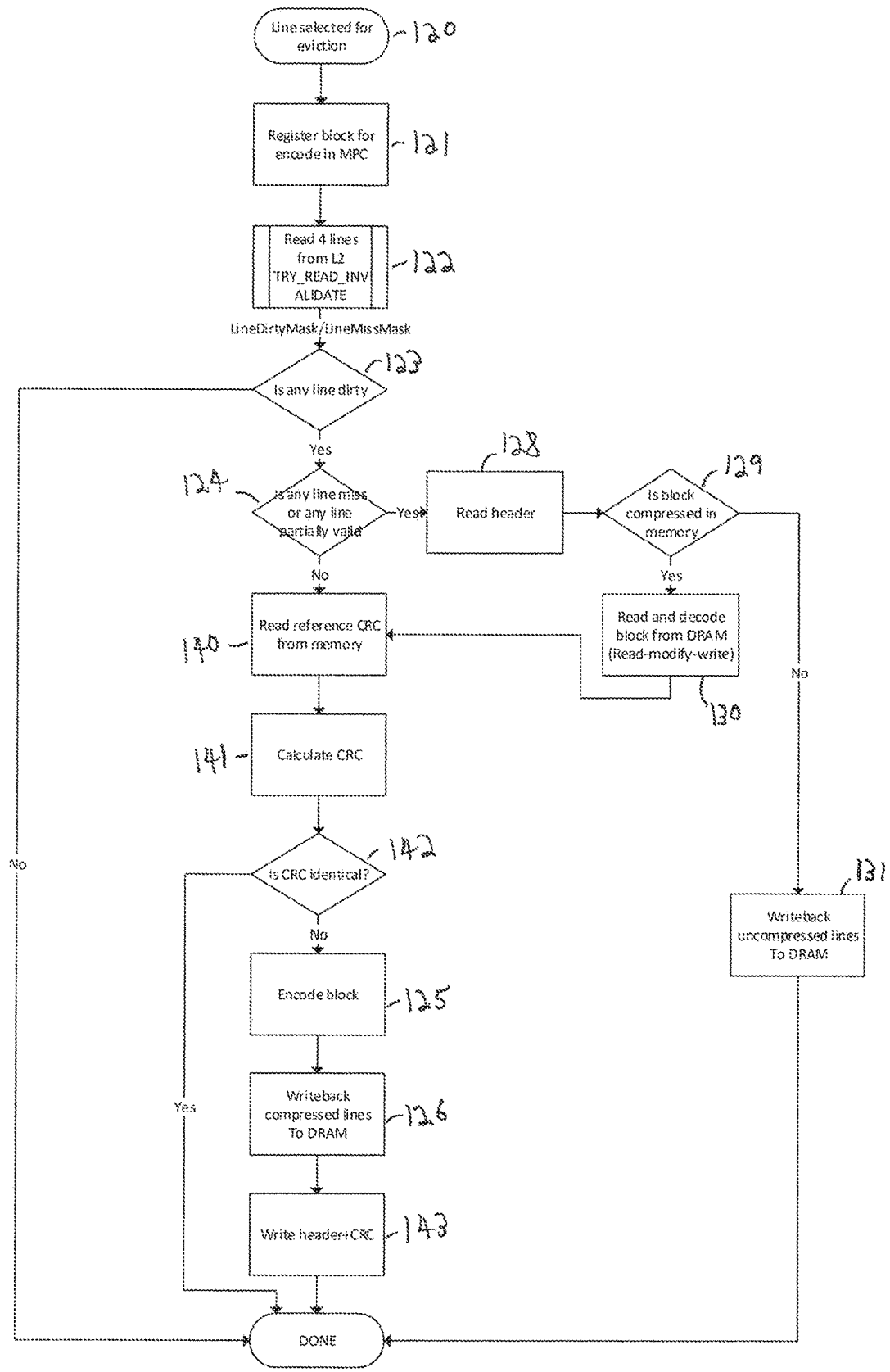
FIG. 10 is a flowchart showing eviction of data from the cache in another embodiment of the technology described herein.

FIGS. 7, 8, 9 and 10 show the operation of the present embodiments when reading data from, writing data to, or evicting data from, the L2 cache 24. FIG. 7 shows the operation when data is being read from the L2 cache 24 for use by a shader core 25 of the graphics processor. FIG. 8 shows the operation when writing data from a shader core 25 to the L2 cache 24. FIGS. 9 and 10 show alternative embodiments for evicting data from the L2 cache 24 back to the main memory system 6.

FIG. 7 shows the operation when data is being read from the L2 cache 24 for use by a shader core 25 of the graphics processor.

When a shader core 25 needs data for a processing operation that it is to perform, it will attempt to read that data from the L2 cache 24, by issuing a read request to the L2 cache.

If the data is present in the L2 cache (i.e. there is "hit" in the L2 cache), then the shader core can read that data from the L2 cache in the normal manner and process that data accordingly.

However, if the data is not present in the L2 cache (i.e. there is a read "miss" in the L2 cache), then the data needs to be fetched from the memory system 6 into the L2 cache 24 for use by the shader core 25 of the graphics processor 10.

In this case, the L2 cache (the controller for the L2 cache) will first determine whether the data that needs to be fetched from the memory system into the cache for use by the shader core is indicated as to be handled by the data encoder 22 or not (as needing processing by the data encoder 22 or not). If not, then the L2 cache controller will request and fetch the data from the memory system 6 into the L2 in the normal manner for the graphics processing and cache system in question.

On the other hand, if the data is indicated as to be processed by the data encoder 22, then the L2 cache (the cache controller) registers the required data for handling by the data encoder 22, for the data encoder 22 to then fetch and process the data and write it into the L2 cache 24 appropriately.

This operation is performed in the present embodiments as shown in FIG. 7.

Thus, as shown in FIG. 7, when there is a read miss in the L2 cache (step 100), and the "missing" data is to be handled by the data encoder 22, the L2 cache 24 (a controller for the L2 cache) notifies (signals) the data encoder 22 that the entire block of data that includes the data that is required (that triggered the read miss) requires fetching and decoding and storing in the L2 cache (step 101).

The data encoder 22 will then first read the header block 71 for the set 72 of data blocks (the memory page) that the block to be fetched and decoded belongs to (step 102), and determine therefrom whether the required data block is stored in compressed form in the memory or not (and if it is stored in uncompressed form in memory, how many external memory transactions are needed to fetch the compressed data) (step 103).

In the present embodiments, the header data (header blocks) is cached locally in the data encoder 22. Thus, when there is a read miss in the L2 cache which registers a decode operation in the data encoder 22, the data encoder 22 first checks if the appropriate header data is present in the header cache which resides in the data encoder 22. If there is a "hit" then the process can directly proceed. If there is a "miss" in the header cache, the data encoder 22 will first read the header data (cache line) from the memory (and cache it in the data encoder 22 for later use by other blocks in the same page).

In the case where the data block is stored in an uncompressed form in the memory 6, then the data encoder 22 will simply operate to read the complete uncompressed block from the memory and store that uncompressed block as a complete block in (four) cache lines of the L2 cache (step 104).

On the other hand, when it is determined that the data block that is required has been stored in a compressed form in the memory, then the data encoder 22 operates to read the appropriate amount of compressed data representing the block from the memory (step 105) (e.g. based on an indication in the header data of how many memory transactions are needed to fetch the complete block). The read compressed data will be stored in the data buffers 65 of the data encoder 22 while it is processed by the data encoder 22 (and before it is written to the L2 cache 24).

The data encoder 22 will then operate to decode the fetched compressed data to thereby provide four lines of uncompressed data (as in the present embodiments each uncompressed data block corresponds to four cache lines worth of data) (step 106), and then write the four uncompressed lines of data to the L2 cache (step 107) (and, if appropriate, mark the so-written lines as not "dirty").

Thus the data encoder 22 will operate to read a compressed data block from the memory 6 but then decode that data and write the data in the block in an uncompressed form into the L2 cache 24 for use by the graphics processor 10.

It should also be noted here that in this operation as shown in FIG. 7, irrespective of how much data is actually required to be written into the L2 cache from the memory, the data is always written into the L2 cache 24 from the memory 6 as complete blocks. This helps to ensure synchronisation between the memory and the data in the L2 cache.

(As will be appreciated, the operation of loading the data into the L2 cache may comprise first allocating appropriate lines in the L2 cache for the data, and/or evicting lines of data already present in the L2 cache so as to provide available lines for storing the new data block. The cache line allocation, eviction, etc., processes can be performed in any suitable and desired manner, such as in accordance with the normal cache operation in those respects for the graphics processing system in question (subject to the operation in the manner of the technology described herein).)

FIG. 8 shows the operation in the present embodiments where data is to be written to L2 cache 24 from a shader core 25. This may be the case where, for example, a shader core has performed some processing of data from a data array from the memory 6, and now wishes to return the modified data back to the memory system. In this case, the data from the shader core 25 will first be written to the L2 cache 24 and then written therefrom back to the memory system 6 as required.

When writing data from the shader core 25 to the L2 cache 24, the write request from the shader core will be sent to the L2 cache 24.

Thus, as shown in FIG. 8, the write process starts with an appropriate write request from the shader core 25 to the L2 cache (step 110).

It is then determined whether there is already a line (an entry) in the L2 cache for the data that is being written (i.e. whether there is a write "hit" in the L2 cache or not (step 111)).

In the event that there is a hit in the L2 cache 24 for the write request (i.e. a line for the data that is being written already exists in the L2 cache), then the new data from the shader core 25 can simply be written to the appropriate line in the L2 cache accordingly (step 112).

As shown in FIG. 8, on the other hand, in the event of a miss in the L2 cache 24 on a write request, it is then determined whether the data being written could be subject to external reads and snooping in the L2 cache (step 113).

This may be determined, e.g., from an appropriate indication (flag) in the MMU page tables (which indication may, e.g., be propagated with the write transaction to the L2 cache where it will be checked).

The data being written may be flagged as being subjected to external reads and snooping in the L2 cache in the case where the memory page in question is shareable with other components in the system beyond the graphics processor itself, such as a CPU or CPUs, such that the memory page is coherent with other components in the system (and not merely coherent internally within the graphics processor (the graphic processor's L2 cache and lower level caches) only). (In the case where the memory page is coherent beyond the graphics processor itself, then the data may be subjected to external reads and snooping in the L2 cache of the graphics processor from the other components (the cache systems of those other components) in the system for that purpose.)

When it is determined that the data being written is not subject to external reads and snooping in the L2 cache, then the new data can simply be written to the L2 cache (once there is a cache line allocated for that data) (step 112).

On the other hand, when it is determined that the data being written to the L2 cache is to be subject to external reads and snooping of the L2 cache, then rather than simply writing the new data to the L2 cache on its own, the data encoder 22 operates to fetch and decompress the remaining data for the block of data that the new data being written to the L2 cache relates to from the memory system 6 (step 114), and then combines that data retrieved from the memory system with the new data to be written to the L2 cache 24 in order to write a complete block of (uncompressed) data (that includes the new data) to the L2 cache (step 112).

This has the effect of enhancing system coherency, by ensuring that a complete block of data is stored in the L2 cache, even if the write request itself only relates to part of a block of data. This will then avoid, for example, any external snoop transactions for the block of data in question to the L2 cache having to depend on external reads (in addition to the read of the L2 cache) (which may otherwise, e.g., risk deadlocking on the interconnect).

(Again, in the case where there was a miss in the L2 cache on a write request, the write operation will first act to allocate lines in the L2 cache for storing the new data (and, e.g., the complete block of data where appropriate), before that data is written to the L2 cache. The new data to be written to the L2 cache and any other block data retrieved from the memory may be appropriately buffered while processing that data and pending the writing of that data to the L2 cache.)

FIG. 9 shows the operation in the present embodiment where data is to be evicted (written) from the L2 cache 24 back to the memory system 6.

As shown in FIG. 9, this process will start when a line of the L2 cache is selected for eviction (and triggered to be evicted) (step 120).

In this case, the L2 cache (the controller for the L2 cache) will first determine whether the line to be evicted from the L2 cache is indicated to be handled by the data encoder 22 or not (as needing processing by the data encoder 22 or not). If not, then the L2 cache controller will evict the line from the L2 cache to the memory system 6 in the normal manner.

On the other hand, if the cache line (data) is indicated as to be processed by the data encoder 22, then the L2 cache (the cache controller) registers the entire block of data that includes the data (line) that is being evicted for handling by the data encoder 22, for the data encoder 22 to then read those cache lines from the L2 cache, process the block of data and write it back to the memory 6 appropriately (step 121).

The data encoder 22 will then attempt to read all the lines relating to the block in question (so including the line selected for eviction but also any cache lines for the block that have not been selected for eviction) from the L2 cache (step 122). The data read for the cache lines from the L2 cache (where present in the L2 cache) is stored in the data buffers 65 of the data encoder 22, pending processing of that data and the writing of that data back to the memory 6.

As part of this processing, the L2 cache will return to the data encoder 22 an indication of which cache lines that it has attempted to read from the L2 cache are marked as being "dirty" (i.e. have been modified since they were loaded into the cache from the memory), and those lines where the read "missed" in the L2 cache (i.e. those lines for the block in question that are not present in the L2 cache).

Any lines that are read from the L2 cache are also invalidated (marked as being invalid) (so available for re-use). (This is done as soon as the L2 cache read operation is completed, so the lines are available for re-use at that point (and before the eviction procedure in the data encoder 22 has been completed).)

It is then determined whether any of the lines attempted to be read from the L2 cache for the block are marked as dirty (i.e. have been modified since they were fetched into the L2 cache) (step 123).

As shown in FIG. 9, in the case that none of the lines of the L2 cache were "dirty" (i.e. the data has not been modified while it has been present in the L2 cache), then the eviction operation can be terminated without writing the data back to the memory system (as there is no need to write the unmodified data back to the memory system). In this case therefore any data read from the L2 cache will be discarded.

As shown in FIG. 9, on the other hand, in the event that any of the lines read from the cache are "dirty" (i.e. the L2 cache 24 is storing modified data for the data block such that the data for the data block needs to be written back to the memory system 6), then it is determined whether the data encoder 22 encountered a line miss when attempting to read all the lines for the block from the L2 cache, or whether any of the read lines were only partially valid (step 124). Thus the data encoder 22, in effect, determines whether all of the data for the data block in question was present in the L2 cache or not.

In the event that all the data was present in the L2 cache (and so read by the data encoder 22 when it attempted to read that data from the L2 cache), then the data encoder 22 encodes (compresses) the uncompressed data for the block that it has read from the L2 cache (step 125), and then writes the compressed data (the compressed cache lines) back to the memory 6 (step 126).

The data encoder will correspondingly update the header for the set of data blocks in question, e.g. to indicate the new compression metadata, such as the number of memory transactions needed to fetch the compressed data for the block, etc. (step 127).

In the case where it is determined that not all of the data for the block in question was stored in the L2 cache (i.e. it is determined at step 124 that there was a line miss or an only partially valid line in the L2 cache), then the data encoder 22 reads the header data for the block in question to determine whether the block should be stored in a compressed form in the memory system 6 or not (steps 128 and 129).

If it is determined that the block is not to be stored in a compressed form in memory, then the data encoder simply operates to write the uncompressed lines for the block read from the L2 cache back to the memory system 6 (step 131).

In this case therefore, the data encoder will write the uncompressed data for the block read from the L2 cache back to the memory system, with any data for the block that was not present in the L2 cache simply being left "as is" in the memory system 6.

On the other hand, when it is determined that the block is stored in a compressed form in the memory, then the data encoder 22 operates to read the compressed data for the (entire) block that is stored in the memory and to decode (decompress) that data (step 130) to provide the uncompressed form of the block as stored in the memory. This block data is stored in the data buffers 65 of the data encoder 22.

This thereby provides to the data encoder the data for the block in an uncompressed form that was "missing" from the L2 cache (since there was a line miss or an only partially valid line in the L2 cache).

The data encoder 22 then combines the new uncompressed data for the block read from the L2 cache, together with the required remaining uncompressed data read and decoded for the block from the memory system 6, to provide a new, complete (and modified) set of uncompressed data for the block, and then encodes (compresses) that data appropriately to provide a new compressed version of the block (step 125). The new, compressed version of the block is then written back to the memory system 6 (step 126), and the header for the set of blocks in question is updated appropriately (step 127).

In this case therefore, rather than simply writing the "new" data from the L2 cache for the data block back to the memory system, a complete new, compressed version of the block is written back to the memory system 6.

This then ensures that a complete compressed block of data is written back to the memory system 6 when data from the L2 cache is to be written back to the memory system in a compressed form. This again helps to ensure coherency and synchronisation of the data blocks as data for the data blocks is transferred to and from the L2 cache.

FIG. 10 shows another embodiment of the operation where data is to be evicted (written) from the L2 cache 24 back to the memory system 6.

The eviction process shown in FIG. 10 is similar to the process shown in FIG. 9, but includes in an addition a check on whether a block to be written back to the memory (to be evicted from the L2 cache) is the same as the version of that block that is already stored in the memory 6 (with the operation in that case, then not writing the block back to the memory 6, as the version of that block stored in the memory 6 is already the same as the block that is to be written back).

As shown in FIG. 10, the determination of whether the new block is the same as the version of the block that is already stored in memory is based on a comparison of content-representative signatures in the form of CRCs (cyclic redundancy checks) for the blocks.

As shown in FIG. 10, the process again starts when a line of the L2 cache is selected for eviction (and triggered to be evicted) (step 120).

Again, the L2 cache (the controller for the L2 cache) first determines whether the line to be evicted from the L2 cache is indicated to be handled by the data encoder 22 or not (as needing processing by the data encoder 22 or not). If not, then the L2 cache controller will evict the line from the L2 cache to the memory system 6 in the normal manner.

On the other hand, if the cache line (data) is indicated as to be processed by the data encoder 22, then the L2 cache (the cache controller) registers the entire block of data that includes the data (line) that is being evicted for handling by the data encoder 22, for the data encoder 22 to then try to read those cache lines from the L2 cache, process the block of data and write it back to the memory 6 appropriately (step 121).

The data encoder 22 will then attempt to read all the lines relating to the block in question (so including the line selected for eviction but also any cache lines for the block that have not been selected for eviction) from the L2 cache (step 122). Again, the data read for the cache lines from the L2 cache (where present in the L2 cache) is stored in the data buffers 65 of the data encoder 22, pending processing of that data and the writing of that data back to the memory 6.

Again, as part of this processing, the L2 cache returns to the data encoder 22 an indication of which cache lines that it has attempted to read from the L2 cache are marked as being "dirty", and those lines where the read "missed" in the L2 cache.

The lines that are read from the L2 cache are also invalidated (marked as being invalid) (so available for re-use).

It is then again determined whether any of the lines attempted to be read from the L2 cache for the block are marked as dirty (step 123) (and in the case that none of the lines of the L2 cache were "dirty", then the eviction operation is terminated without writing the data back to the memory system (and the read data is discarded)).

Again, in the event that any of the lines read from the cache are "dirty", then it is determined whether the data encoder 22 encountered a line miss when attempting to read all the lines for the block from the L2 cache or whether any of the read lines were only partially valid (step 124).

In the event that all the data was present in the L2 cache (and so read by the data encoder 22 when it attempted to read that data from the L2 cache), then the data encoder 22 reads the content representative signature (CRC) stored in the header block (as shown in FIG. 6) (or a separate CRC buffer) for the block in the memory that the block to be written back corresponds to (for the block in memory having the same position in the data array as the block to be written back), to determine the CRC for that corresponding block in the memory (step 140).

The data encoder then calculates a new CRC representative of the content of the new block that is to be written back to the memory 6 (step 141), and then compares that newly calculated CRC for the new block to be written back to the memory 6 with the CRC read from the header for the version of the block already stored in the memory (step 142).

In the case that the CRC for the new block is the same as the CRC for the version of the block that is already stored in the memory 6 (thereby indicating that the content of the two blocks is the same (sufficiently similar)), then the data encoder does not write the new block back to the memory 6 (and the read data is discarded). This, in effect, leaves the existing version of the block in the memory.

On the other hand, when the CRC comparisons determine that the new block is different to the version of the block that is already in the memory, then the new block must be written back to the memory 6.

The data encoder 22 accordingly then encodes (compresses) the data for the new block appropriately to provide a new compressed version of the block (step 125). The new, compressed version of the block is then written back to the memory system 6 (step 126) (to replace the existing version of the block).

The data encoder will correspondingly update the header for the set of data blocks in question, e.g. to indicate the new compression metadata, such as the number of memory transactions needed to fetch the compressed data for the block, etc., and write the new CRC (content-representing signature) for the block (determined at step 141), e.g. to the header, or to a separate CRC buffer, as appropriate (step 143).

In the case where it is determined that not all of the data for the block in question was stored in the L2 cache (i.e. it is determined at step 124 that there was a line miss or an only partially valid line in the L2 cache), then again the data encoder 22 reads the header for the set of data blocks in question to determine whether the block is stored in a compressed form in the memory or not (steps 128 and 129).

When it is determined that the data block in question is not to be stored in a compressed form in the memory 6, then the uncompressed lines of data from the L2 cache 24 can simply be written directly back to the memory system 6 by the data encoder 22 in their uncompressed form (step 131).

On the other hand, when it is determined that the block is stored in a compressed form in the memory at step 129, then the data encoder 22 operates to read the compressed data for the (entire) block that is stored in the memory and to decode (decompress) that data (step 130) to provide the uncompressed form of the block as stored in the memory. This block data is stored in the data buffers 65 of the data encoder 22.

This thereby provides to the data encoder the data for the block in an uncompressed form that was "missing" from the L2 cache (since there was a line miss or an only partially valid line in the L2 cache).

The data encoder 22 then combines the new uncompressed data for the block read from the L2 cache, together with the required remaining uncompressed data read and decoded for the block from the memory system 6, to provide a new, complete (and modified) set of uncompressed data for the block (which is stored in the data buffer of the data encoder).

The data encoder 22 then reads the content representative signature (CRC) stored in the header block (or a separate CRC buffer) for the block in the memory that the block to be written back corresponds to, to determine the CRC for that corresponding block in the memory (step 140).

The data encoder then calculates a new CRC representative of the content of the new block (step 141), and then compares that newly calculated CRC for the new block to be written back to the memory 6 with the CRC for the version of that block stored in the memory (step 142).

In the case that the CRC for the new block is the same as the CRC for the version of the block that is already stored in the memory 6 (thereby indicating that the content of the two blocks is the same (sufficiently similar)), then again the data encoder does not write the new block back to the memory 6 (and the data for the block is discarded), but instead leaves the existing version of the block in the memory.

On the other hand, when the CRC comparisons determine that the new block is different to the version of the block that is already in the memory, then the new block must be written back to the memory 6.

The data encoder 22 accordingly then encodes (compresses) the data for the new block appropriately to provide a new compressed version of the block (step 125). The new, compressed version of the block is then written back to the memory system 6 (step 126).

The data encoder will correspondingly update the header for the set of data blocks in question, e.g. to indicate the new compression metadata, such as the number of memory transactions needed to fetch the compressed data for the block, etc., and write the new CRC (content-representing signature) for the block (determined at step 141) to the header or to a separate CRC buffer, as appropriate (step 143).

Although the present embodiments have been discussed above with particular reference to cache operations in relation to a graphics processor in a graphics processing system, the Applicants have recognised that the use of a data encoder associated with a cache in the manner of the present embodiments discussed above would be useful in other cache arrangements and systems, and not just in the context of graphics processors.

For example, it could be advantageous to integrate a data encoder in the manner of the technology described herein with a system cache that serves plural processors, such as a graphics processor, a display processor, a video processor and an image signal processor (ISP), with the system cache presenting data to the main memory system in a compressed form, and uncompressed to the processors (masters) connected to the system cache.

It can be seen from the above that the technology described herein, in its embodiments at least, provides an efficient and effective mechanism for transferring compressed data between a memory system and a graphics processor that is to process that data in an uncompressed form.

This is achieved in the embodiments of the technology described herein at least, by performing the compression or decompression on, e.g. L2, cache line fill/evict operations and by performing those operations for complete blocks of data when writing data to or evicting data from the, e.g. L2, cache. Thus the compression and decompression is performed on cache operations and, where necessary, on complete blocks of data as part of those cache operations. This then ensures that the compressed data blocks are synchronised on line fill and evict operations to and from the, e.g., L2 cache, notwithstanding that the compression and decompression is being done at the (e.g. L2), cache level.

Whilst the foregoing detailed description has been presented for the purposes of illustration and description, it is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A data processing system comprising:
a memory system;
a processor; and
a cache system configured to transfer data stored in the memory system to the processor for use by the processor when performing data processing operations and to transfer data from the processor to the memory system;
the cache system comprising:
a cache configured to receive data from the memory system and to provide data to the processor for use when performing data processing operations and to receive data from the processor for sending to the memory system; and
a data encoder associated with the cache and configured to:
when data is to be written from the cache to the memory system, encode uncompressed data from the cache for storing in the memory system in a compressed format and send the data in the compressed format to the memory system for storing; and
when data in a compressed format is to be read from the memory system into the cache, decode the compressed data from the memory system and store the data in the cache in an uncompressed format;
wherein the data encoder associated with the cache is further configured to:
when data is to be written back from the processor to the cache that is associated with the data encoder after having been modified by the processor and the data to be written to the cache from the processor is only part of a block of compressed data as stored in the memory system:
determine whether a version of the block of data is present in the cache;
when it is determined that a version of the block of data is not present in the cache:
determine whether the data to be written to the cache from the processor that is only part of a block of compressed data as stored in the memory system could be subject to external read transactions;
when it is determined that the data to be written to the cache from the processor that is only part of a block of compressed data as stored in the memory system could be subject to external read transactions:
fetch a version of the block of compressed data as stored in the memory system from the memory system;
decompress the version of the block of compressed data that was fetched from the memory system;
combine the data that is to be written to the cache from the processor with other data from the block of data that was fetched from the memory system, to thereby provide a complete version of the block of data including the new data for the block from the processor for writing to the cache in an uncompressed format; and
write the complete version of the block of data to the cache in an uncompressed format; and
when it is determined that the data to be written to the cache from the processor that is only part of a block of compressed data as stored in the memory system could not be subject to external read transactions;
write the data to be written to the cache from the processor that is only part of a block of compressed data as stored in the memory system to the cache without combining it with other data for the block of data; and
when it is determined that a version of the block of data is present in the cache:
combine the data that is to be written to the cache from the processor with other data from the block of data that is present in the cache; and
write the complete version of the block of data to the cache in an uncompressed format.

2. The system of claim 1, wherein the cache is an L2 cache of the cache system.

3. The system of claim 1, wherein the data encoder is configured to encode and decode the data using a block-based compression technique.

4. The system of claim 1, wherein the data encoder is integrated with the cache itself, or with an interconnect arranged to interface between the cache and a processing core(s) of the processor.

5. The system of claim 1, wherein:
the data encoder associated with the cache is configured to:
when data in a compressed format is to be read from the memory system into the cache, read an entire compressed block of data that contains the required data from the memory system, decode the compressed block of data, and write the complete block of data in an uncompressed format into the cache.

6. The system of claim 1, wherein:
the data encoder associated with the cache is configured to:
when data is to be written from the cache to the memory system in a compressed format, write a complete block of compressed data including the data that is to be written from the cache to the memory system to the memory system.

7. The system of claim 6, wherein:
the data encoder associated with the cache is configured to:
when data is to be written from the cache to the memory system in a compressed format, also update header data for the data block that is written back to the memory system.

8. The system of claim 6, wherein:
the data encoder associated with the cache is configured to:
when data is to be written from the cache to the memory system in a compressed format, before writing a block of data including the data to be written from the cache to the memory system back to the memory system, determine whether the block of data is sufficiently similar to the version of the block of data that is already stored in the memory, and in the event that the block of data is determined to be sufficiently similar to the version of the block of data that is already stored in memory, not write the new block of data back to the memory system.

9. The system of claim 1, wherein the processor is a graphics processor.

10. The system of claim 1, wherein the data encoder associated with the cache is configured to:
when data is to be written back from the cache to the memory system and the data to be written from the cache to the memory system is only part of a block of compressed data as stored in the memory system:
fetch a version of the block of compressed data as stored in the memory system from the memory system;
decompress the version of the block of compressed data that was fetched from the memory system; and
combine the data that is to be written from the cache to the memory system with other data from the block of data that was fetched from the memory system, to thereby provide a complete version of the block of data including the data for the block from the cache for writing to the memory system in a compressed format.

11. A method of operating a data processing system, the data processing system comprising:
a memory system;
a processor; and
a cache system configured to transfer data stored in the memory system to the processor for use by the processor when performing data processing operations and to transfer data from the processor to the memory system;
the cache system comprising a cache configured to receive data from the memory system and to provide data to the processor for use when performing data processing operations and to receive data from the processor for sending to the memory system, and a data encoder associated with the cache;
the method comprising:
when data is to be written from the cache to the memory system, the data encoder encoding uncompressed data from the cache for storing in the memory system in a compressed format and sending the data in the compressed format to the memory system for storing; and
when data in a compressed format is to be read from the memory system into the cache, the data encoder decoding the compressed data from the memory system and storing the data in the cache in an uncompressed format;
the method further comprising:
when data is to be written back from the processor to the cache that is associated with the data encoder after having been modified by the processor and the data to be written to the cache from the processor is only part of a block of compressed data as stored in the memory system:
determining whether a version of the block of data is present in the cache;
when it is determined that a version of the block of data is not present in the cache:
determining whether the data to be written to the cache from the processor that is only part of a block of compressed data as stored in the memory system could be subject to external read transactions;
when it is determined that the data to be written to the cache from the processor that is only part of a block of compressed data as stored in the memory system could be subject to external read transactions:
fetching a version of the block of compressed data as stored in the memory system from the memory system;
decompressing the version of the block of compressed data that was fetched from the memory system;
combining the data that is to be written to the cache from the processor with other data from the block of data that was fetched from the memory system, to thereby provide a complete version of the block of data including the new data for the block from the processor for writing to the cache in an uncompressed format; and
writing the complete version of the block of data to the cache in an uncompressed format; and
when it is determined that the data to be written to the cache from the processor that is only part of a block of compressed data as stored in the memory system could not be subject to external read transactions:
writing the data to be written to the cache from the processor that is only part of a block of compressed data as stored in the memory system to the cache without combining it with other data for the block of data; and when it is determined that a version of the block of data is present in the cache:
combining the data that is to be written to the cache from the processor with other data from the block of data that is present in the cache; and
writing the complete version of the block of data to the cache in an uncompressed format.

12. The method of claim 11, wherein the cache is an L2 cache of the cache system.

13. The method of claim 11, comprising encoding and decoding the data using a block-based compression technique.

14. The method of claim 11, comprising:
when data in a compressed format is to be read from the memory system into the cache, reading an entire compressed block of data that contains the required data from the memory system, decoding the compressed block of data, and writing the complete block of data in an uncompressed format into the cache.

15. The method of claim 11, comprising:
when data is to be written back from the processor to the cache that is associated with the data encoder after having been modified by the processor and the data to be written to the cache from the processor is only part of a block of compressed data as stored in the memory system:
combining the data that is to be written to the cache from the processor with other data for the block of data fetched from the memory system, to thereby provide a complete version of the block of data including the new data for the block from the processor for writing to the cache in an uncompressed format.

16. The method of claim 11, comprising:
when data is to be written from the cache to the memory system in a compressed format, writing a complete block of compressed data including the data that is to be written from the cache to the memory system to the memory system.

17. The method of claim 16, comprising:
when data is to be written from the cache to the memory system in a compressed format, also updating header data for the data block that is written back to the memory system.

18. The method of claim 16, comprising:
when data is to be written from the cache to the memory system in a compressed format, before writing a block of data including the data to be written from the cache to the memory system back to the memory system, determining whether the block of data is sufficiently similar to the version of the block of data that is already stored in the memory, and in the event that the block of data is determined to be sufficiently similar to the version of the block of data that is already stored in memory, not writing the new block of data back to the memory system.

19. The method of claim 11, wherein the processor is a graphics processor.

20. The method of claim 11, comprising:
when data is to be written back from the cache to the memory system and the data to be written from the cache to the memory system is only part of a block of compressed data as stored in the memory system:
fetching a version of the block of compressed data as stored in the memory system from the memory system;
decompressing the version of the block of compressed data that was fetched from the memory system; and
combining the data that is to be written from the cache to the memory system with other data from the block of data that was fetched from the memory system, to thereby provide a complete version of the block of data including the data for the block from the cache for writing to the memory system in a compressed format.

21. A non-transitory computer readable storage medium storing computer software code which when executing on a processor performs a method of operating a data processing system, the data processing system comprising:
a memory system;
a processor; and
a cache system configured to transfer data stored in the memory system to the processor for use by the processor when performing data processing operations and to transfer data from the processor to the memory system;
the cache system comprising a cache configured to receive data from the memory system and to provide data to the processor for use when performing data processing operations and to receive data from the processor for sending to the memory system, and a data encoder associated with the cache;
the method comprising:
when data is to be written from the cache to the memory system, the data encoder encoding uncompressed data from the cache for storing in the memory system in a compressed format and sending the data in the compressed format to the memory system for storing; and
when data in a compressed format is to be read from the memory system into the cache, the data encoder decoding the compressed data from the memory system and storing the data in the cache in an uncompressed format
the method further comprising:
when data is to be written back from the processor to the cache that is associated with the data encoder after having been modified by the processor and the data to be written to the cache from the processor is only part of a block of compressed data as stored in the memory system:
determining whether a version of the block of data is present in the cache;
when it is determined that a version of the block of data is not present in the cache:
determining whether the data to be written to the cache from the processor that is only part of a block of compressed data as stored in the memory system could be subject to external read transactions;
when it is determined that the data to be written to the cache from the processor that is only part of a block of compressed data as stored in the memory system could be subject to external read transactions:
fetching a version of the block of compressed data as stored in the memory system from the memory system;
decompressing the version of the block of compressed data that was fetched from the memory system;
combining the data that is to be written to the cache from the processor with other data from the block of data that was fetched from the memory system, to thereby provide a complete version of the block of data including the new data for the block from the processor for writing to the cache in an uncompressed format; and
writing the complete version of the block of data to the cache in an uncompressed format; and when it is determined that the data to be written to the cache from the processor that is only part of a block of compressed data as stored in the memory system could not be subject to external read transactions:
writing the data to be written to the cache from the processor that is only part of a block of compressed data as stored in the memory system to the cache without combining it with other data for the block of data; and when it is determined that a version of the block of data is present in the cache:
combining the data that is to be written to the cache from the processor with other data from the block of data that is present in the cache; and
writing the complete version of the block of data to the cache in an uncompressed format.

\* \* \* \* \*